United States Patent
Bursalioglu et al.

(10) Patent No.: US 8,325,840 B2
(45) Date of Patent: *Dec. 4, 2012

(54) TREE POSITION ADAPTIVE SOFT OUTPUT M-ALGORITHM RECEIVER STRUCTURES

(75) Inventors: Ozgun Bursalioglu, Los Angeles, CA (US); Haralabos Papadopoulos, San Jose, CA (US); Carl-Erik W. Sundberg, Sunnyvale, CA (US)

(73) Assignee: NTT DoCoMo, Inc., Tokyo (JP)

( * ) Notice: Subject to any disclaimer, the term of this patent is extended or adjusted under 35 U.S.C. 154(b) by 994 days.

This patent is subject to a terminal disclaimer.

(21) Appl. No.: 12/335,389

(22) Filed: Dec. 15, 2008

(65) Prior Publication Data

US 2009/0213954 A1  Aug. 27, 2009

Related U.S. Application Data

(60) Provisional application No. 61/031,077, filed on Feb. 25, 2008.

(51) Int. Cl.
*H04B 7/02* (2006.01)
(52) U.S. Cl. ........ 375/267; 375/260; 375/262; 375/269; 375/340; 375/343; 375/346
(58) Field of Classification Search .................. 375/260, 375/261, 262, 267, 340, 343; 370/203, 204, 370/205, 208, 209, 210
See application file for complete search history.

(56) References Cited

U.S. PATENT DOCUMENTS

| | | | |
|---|---|---|---|
| 5,903,842 A | 5/1999 | Wang et al. | |
| 5,982,327 A | 11/1999 | Vook et al. | |
| 6,629,287 B1 | 9/2003 | Brink | |
| 6,804,307 B1 | 10/2004 | Popovic | |
| 6,862,552 B2 | 3/2005 | Goldstein et al. | |
| 6,901,117 B1 | 5/2005 | Classon et al. | |
| 7,042,858 B1 | 5/2006 | Ma et al. | |

(Continued)

FOREIGN PATENT DOCUMENTS

EP 1162750 A2 12/2001

(Continued)

OTHER PUBLICATIONS

Kitty Wong and Peter McLane, Low complexity space-time turbo equalizer with the soft-output M-algorithm for Frequency selective channels, 2005 IEEE.*

(Continued)

*Primary Examiner* — Dhaval Patel
(74) *Attorney, Agent, or Firm* — Blakely, Sokoloff, Taylor & Zafman LLP

(57) ABSTRACT

A method and apparatus for tree position adaptive SOMA receiver structures are disclosed herein. In one embodiment, a device for use in a wireless communication system comprises a receiver to receive information-bearing signals from the transmitter wirelessly transmitted using OFDM and bit interleaved coded modulation, where the receiver includes an inner decoder structure having a soft output M-algorithm (SOMA) based multiple-in multiple-out (MIMO) joint demapper that uses a SOMA-based MIMO detection process to perform joint inner demapping over each tone, and wherein the SOMA-based MIMO joint demapper is operable to search a detection tree for each tone using a tree-search symbol order that is adapted for each tone based on channel state information and extrinsic information from the outer decoder, where only a number of best alternatives from every level of the tree are expanded.

23 Claims, 10 Drawing Sheets

U.S. PATENT DOCUMENTS

| | | | |
|---|---|---|---|
| 7,072,295 B1 | 7/2006 | Benson et al. | |
| 7,095,812 B2 | 8/2006 | Chan | |
| 7,251,768 B2 | 7/2007 | Giannakis et al. | |
| 7,308,047 B2 | 12/2007 | Sadowsky | |
| 7,310,369 B1* | 12/2007 | Krieger et al. | 375/227 |
| 7,436,895 B1 | 10/2008 | Tujkovic | |
| 7,441,045 B2 | 10/2008 | Skene et al. | |
| 7,443,925 B2 | 10/2008 | Mehta et al. | |
| 7,564,915 B2 | 7/2009 | Lee et al. | |
| 7,620,117 B2 | 11/2009 | Chae et al. | |
| 7,877,097 B2 | 1/2011 | Zhu et al. | |
| 7,877,108 B2 | 1/2011 | Wengerter et al. | |
| 8,042,031 B2* | 10/2011 | Chen et al. | 714/794 |
| 2002/0114404 A1 | 8/2002 | Aizawa et al. | |
| 2002/0176431 A1 | 11/2002 | Golla et al. | |
| 2003/0236080 A1 | 12/2003 | Kadous et al. | |
| 2004/0022179 A1 | 2/2004 | Giannakis et al. | |
| 2004/0116146 A1 | 6/2004 | Sadowsky et al. | |
| 2004/0165675 A1* | 8/2004 | Ito et al. | 375/267 |
| 2004/0205445 A1 | 10/2004 | Xu | |
| 2005/0010675 A1 | 1/2005 | Jaggi et al. | |
| 2005/0041751 A1 | 2/2005 | Nir et al. | |
| 2005/0047514 A1 | 3/2005 | Bolinth et al. | |
| 2005/0068918 A1 | 3/2005 | Mantravadi et al. | |
| 2005/0111592 A1 | 5/2005 | Yee | |
| 2005/0152391 A1 | 7/2005 | Effros et al. | |
| 2005/0185707 A1 | 8/2005 | Hoo et al. | |
| 2005/0265280 A1 | 12/2005 | Roh et al. | |
| 2006/0002312 A1 | 1/2006 | Delattre et al. | |
| 2006/0020560 A1 | 1/2006 | Rodriguez et al. | |
| 2006/0029124 A1 | 2/2006 | Grant et al. | |
| 2006/0098760 A1 | 5/2006 | Shen et al. | |
| 2006/0146716 A1 | 7/2006 | Lun et al. | |
| 2006/0146791 A1 | 7/2006 | Deb et al. | |
| 2006/0148506 A1 | 7/2006 | Hoo | |
| 2006/0176945 A1 | 8/2006 | Li | |
| 2007/0041475 A1* | 2/2007 | Koshy et al. | 375/340 |
| 2007/0066229 A1 | 3/2007 | Zhang et al. | |
| 2007/0198899 A1* | 8/2007 | Yellin et al. | 714/776 |
| 2007/0281633 A1 | 12/2007 | Papadopoulos | |
| 2007/0286313 A1 | 12/2007 | Nikopour-Deilami et al. | |
| 2008/0025430 A1 | 1/2008 | Sadowsky | |
| 2008/0032630 A1 | 2/2008 | Kim et al. | |
| 2008/0075022 A1 | 3/2008 | Lei et al. | |
| 2008/0092028 A1* | 4/2008 | Orio | 714/796 |
| 2008/0101310 A1 | 5/2008 | Marzetta | |
| 2008/0123781 A1 | 5/2008 | Pisek et al. | |
| 2008/0181339 A1* | 7/2008 | Chen et al. | 375/341 |
| 2008/0212526 A1 | 9/2008 | Oyman | |
| 2009/0082054 A1 | 3/2009 | Li et al. | |
| 2009/0213954 A1 | 8/2009 | Bursalioglu et al. | |
| 2009/0225878 A1 | 9/2009 | Papadopoulos et al. | |
| 2009/0285323 A1 | 11/2009 | Sundberg et al. | |
| 2009/0291699 A1 | 11/2009 | Heath et al. | |
| 2009/0296842 A1 | 12/2009 | Papadopoulos et al. | |

FOREIGN PATENT DOCUMENTS

| | | | |
|---|---|---|---|
| EP | 1383246 A2 | 1/2004 | |
| EP | 1411693 A2 | 4/2004 | |
| EP | 1521386 A2 | 4/2005 | |
| EP | 1530387 A1 | 5/2005 | |
| EP | 1648097 A | 4/2006 | |
| EP | 1648097 A2 | 4/2006 | |
| EP | 1827040 A1 | 8/2007 | |
| EP | 1863208 A1 | 12/2007 | |
| GB | 2304495 | 3/1997 | |
| GB | 2407007 A | 4/2005 | |
| KR | 1020060063478 A | 6/2006 | |
| WO | WO 01/43293 A1 | 6/2001 | |
| WO | WO 2004/045167 A | 5/2004 | |
| WO | WO 2004/025011 A | 7/2004 | |
| WO | WO 2004/056011 A | 7/2004 | |
| WO | WO 2005/046081 A1 | 5/2005 | |
| WO | WO 2006/029050 A | 3/2006 | |
| WO | WO 2007/050860 A1 | 5/2007 | |
| WO | WO 2007/073267 A1 | 6/2007 | |
| WO | WO 2007/087540 A2 | 8/2007 | |
| WO | WO 2007/129990 A1 | 11/2007 | |
| WO | WO 2008/057791 A1 | 5/2008 | |
| WO | WO 2008/143973 A1 | 11/2008 | |
| WO | WO 2009/033023 A2 | 3/2009 | |
| WO | WO 2010/019618 A2 | 2/2010 | |

OTHER PUBLICATIONS

Kitty Wong and Peter Malne, Bi-Directional Soft-output M-algorithm for Iterative decoding, IEEE communications society, 2004 IEEE.*

International Search Report dated Apr. 17, 2009 for PCT/US2008/076252, 5 pages.

Written Opinion of the International Searching Authority dated Apr. 17, 2008 for PCT/US2008/076252, 9 pages.

Osseiran, A., The Winner II Air Interface: Refined Spatial-Temporal Processing Solutions, Online Citation <https://www.ist-winner.org/WINNER2-Deliverables/D3.4.1.pdf>, Jan. 1, 2007, pp. 1-148.

Bandemer, B., et al., "Linear MMSE Multi-User MIMO Downlink Precoding for Users with Multiple Antennas", IEEE International Symposium on Personal, Indoor and Mobile Communications, Sep. 1, 2006, pp. 1-5.

Catt, "Non-codebook based pre-coding for E-UTRA TDD Downlink", 3rd Generation Partnership Project, Oct. 4, 2006, pp. 1-3.

Gomadam, K.S., et al., "Techniques for Multi-user MIMO with Two-way Training", IEEE International Conference on Communications, May 19, 2008, pp. 3360-3366.

Written Opinion of the International Searching Authority dated Apr. 30, 2009 for PCT/US2007/022189, 8 pages.

US Final Office Action for U.S. Appl. No. 11/644,638, dated Apr. 29, 2010, 22 pages.

Korean Office Action for corresponding Korean Patent Application No. 2008-7023249, dated May 27, 2010, 4 Pgs.

European Office Action for corresponding European Patent Application No. 07862325.3, dated Jul. 6, 2010, 6 pgs.

PCT International Search Report for PCT Patent Application No. PCT/US2009/053472, dated Jun. 14, 2010, 7 pgs.

Written Opinion of the International Searching Authority for PCT Patent Application No. PCT/US2009/053472, dated Jun. 14, 2010, 5 pgs.

US Final Office Action for U.S. Appl. No. 12/040,653, dated Jun. 15, 2010, 40 pages.

US Final Office Action for U.S. Appl. No. 12/209,110, dated Jul. 14, 2011, 26 pgs.

US Office Action for U.S. Appl. No. 12/335,409, dated Aug. 16, 2011, 20 pgs.

US Notice of Allowance for U.S. Appl. No. 11/664,638, dated Jun. 9, 2011, 10 pgs.

US Office Action for U.S. Appl. No. 11/754,903, dated Jun. 6, 2011, 11 pgs.

US Office Action for U.S. Appl. No. 12/040,653, dated Dec. 11, 2009, 33 pages.

PCT International Preliminary Report on Patentability for PCT Patent Application No. PCT/US2008/003274, dated Sep. 24, 2009, 10 pages.

PCT International Search Report for PCT Patent Application No. PCT/US2007/013074, dated Dec. 2, 2009, 8 pgs.

Written Opinion of the International Searching Authority for PCT Patent Application No. PCT/US2007/013074, dated Dec. 2, 2009, 8 pgs.

PCT International Search Report for PCT Patent Application No. PCT/US2009/046014, dated Nov. 27, 2009, 7 pgs.

Written Opinion of the International Searching Authority for PCT Patent Application No. PCT/US2009/046014, dated Nov. 27, 2009, 8 pgs.

Stiglmayr, Stephan, et al., "Adaptive Coding and Modulation in OFDM Systems using BICM and Rate-Compatible Punctured Codes", 7 pages.

G. J. Foschini, H. C. Huang, M. K. Karakayali, R. A. Valenzuela, and S. Venkatesan, "The value of coherent base station coordination," in Proceedings of the 39th Annual Conference on Information Sciences and Systems (CISS '05), The Johns Hopkins University, Baltimore, MD, USA, Mar. 2005.

Yiu, S., et al., "Distributed Space-Time Block Coding for Cooperative Networks with Multiple Antenna Nodes", Computational Advances in Multi-Sensor Adaptive Processing, Dec. 13, 2005, pp. 52-55.

Yiu, Simon, et al., "Optimization of Distributed Space-Time Filtering", IEEE 62nd Vehicular Technology Conference, Sep. 2005, pp. 1829-1833, Piscataway, New Jersey, USA.

Adachi, Koichi, et al., "Iterative Modified QRD-M Based on CRC Codes for OFDM MIMO Multiplexing", IEICE Transactions on Communications, Jun. 1, 2007, pp, 1433-1443, vol. E90B, No. 6, Tokyo, Japan.

Detert, Thorben "An Efficient Fixed Complexity QRD-M Algorithm for MIMO-0FDM using Per-Survivor Slicing", IEEE 4th International Symposium on Wireless Communications Systems, Oct. 1, 2007, pp. 572-576, Piscataway, New Jersey, USA.

US Office Action for U.S. Appl. No. 11/644,638, dated Sep. 22, 2009, 13 pages.

PCT International Preliminary Report on Patentability for PCT Patent Application No. PCT/US2007/013074, dated Dec. 30, 2009, 8 pages.

PCT International Search Report for PCT Patent Application No. PCT/US2008/006287, dated Oct. 2, 2008, 6 pgs.

Written Opinion of the International Searching Authority for PCT Patent Application No. PCT/US2008/006287, dated Oct. 2, 2008, 7 pgs.

PCT International Preliminary Report on Patentability for PCT Patent Application No. PCT/US2008/065675, dated Dec. 17, 2009, 8 pages.

PCT International Search Report for PCT Patent Application No. PCT/US2009/054937, dated Dec. 30, 2009, 7 pgs.

Written Opinion of the International Searching Authority for PCT Patent Application No. PCT/US2009/054937, dated Dec. 30, 2009, 7 pgs.

Robertson, Patrick, et al., "A Comparison of Optimal and Sub-Optimal MAP Decoding Algorithms Operating in the Log Domain", Proceedings of the International Conference on Communications, Jun. 18, 1995, pp. 1009-1013, vol. 2, IEEE, New York, USA.

PCT International Search Report for PCT Patent Application No. PCT/US2009/56865, dated Mar. 2, 2010, 7 pgs.

Written Opinion of the International Searching Authority for PCT Patent Application No. PCT/US2009/56865, dated Mar. 2, 2010, 12 pgs.

PCT International Search Report for PCT Patent Application No. PCT/US2009/034758, dated Feb. 4, 2010, 7 pgs.

Written Opinion of the International Searching Authority for PCT Patent Application No. PCT/US2009/034758, dated Feb. 4, 2010, 7 pgs.

Sun, Sumel et al., "Pseudo-Inverse MMSE Based QRD-M Algorithm for MIMO OFDM", Jan. 1, 2006, pp. 1545-1549, vol. 3.

Dai, Yongmei, et al., "A Comparative Study of QRD-M Detection and Sphere Decoding for MIMI-OFDM Systems", 2005 IEEE 16th International Symposium on Personal, Indoor and Mobile Radio Communications, Jan. 1, 2005, pp. 186-190.

US Office Action for U.S. Appl. No. 11/873,248, dated Mar. 31, 2010, 18 pages.

Korean Office Action for corresponding Korean Patent Application No. 2008-7025915, dated Feb. 9, 2010,.

PCT International Preliminary Report on Patentability for PCT Patent Application No. PCT/US2008/076252, dated Apr. 1, 2010, 9 pages.

PCT International Preliminary Report on Patentability for PCT Patent Application No. PCT/US2008/073646, dated Mar. 4, 2010, 6 pages.

Su, W., et al., "Two Generalized Complex Orthogonal Space-Time Block Codes of Rates 7/11 and 3/5 for 5 and 6 Transmit Antennas", IEEE Transactions on Information Theory, Jan. 2003, vol. 49, No. 1, pp. 313-316.

Alamouti, S., "A Simple Transmit Diversity Technique for Wireless Communications", IEEE Journal on Select Areas in Communications, vol. 16, No. 8, Oct. 1998, pp. 1451-1458.

Chindapol, A., et al., "Design, Analysis, and Performance Evaluation for BICM-ID with Square QAM Constellations in Rayleigh Fading Channels", IEEE Journal on Selected Areas in Communications, vol. 19, No. 5, May 2001, pp. 944-957.

Wong, K., "The Soft-Output M-Algorithm and Its Applications", PhD Thesis, Queens University, Kingston, Canada, Aug. 2006, 263 pages.

Lee, I., et al., "Space-Time Bit-Interleaved Coded Modulation for OFDM Systems", IEEE Transactions on Signal Processing, vol. 52, No. 3, Mar. 2004, pp. 820-825.

Lee, H., et al., "A Flexible Space-Time Coding System with Unequal Error Protection", Proceedings of Vehicular Technology Conference, Stockholm, Sweden, May 2005, 5 pages.

Lee, I., et al., "Reduced-Complexity Receiver Structures for Space-Time Bit-Interleaved Coded Modulation Systems", IEEE Transactions on Communications, vol. 55, No. 1, Jan. 2007, pp. 142-150.

Lee, I., et al., "Code Construction for Space-Time Bit-Interleaved Coded Modulation Systems", Proceedings of the IEEE International Conference on Communications, Jun. 2004, pp. 722-726.

Li, X., et al., "Bit-Interleaved Coded Modulation with Iterative Decoding and 8PSK Signaling", IEEE Transactions on Communications, vol. 50, No. 8, Aug. 2008, pp. 1250-1257.

Noh, Y., et al., "Design of Unequal Error Protection for MIMO-OFDM Systems with Heirarchical Signal Constellations", Journal of Communications and Networks, vol. 9, No. 2, Jun. 2007, pp. 167-176.

Taoka, H., et al., "Field Experiments on Ultimate Frequency Efficiency Exceeding 30 Bit/Second/Hz Using MLD Signal Direction in MIMO-OFDM Broadband Packet Radio Access", Proceedings of IEEE Conference on Vehicular Technology, Apr. 2007, pp. 2129-2134.

US Final Office Action for U.S. Appl. No. 11/873,248, dated Sep. 1, 2010, 21 pages.

US Office Action for U.S. Appl. No. 11/939,353 dated Jan. 31, 2011, 15 pages.

Sen, et al., "Cute and jCUTE Concolic Unit Testing and Explicit Path Model-Checking Tool", Computer Aided Verification Lecture Notes in Computer Science, Jan. 1, 2006, pp. 419-423.

Majumdar, et al., "Hybrid Concolic Testing", IEEE 29th International Conference on Software Engineering, May 1, 2007, pp. 416-426.

PCT International Preliminary Report on Patentability for PCT Patent Application No. PCT/US2009/046014, dated Dec. 16, 2010, 9 pages.

PCT International Search Report for PCT Patent Application No. PCT/US2010/033549, Jan. 5, 2011, 5 pgs.

PCT Written Opinion of the International Searching Authority for PCT Patent Application No. PCT/US2010/033549, Jan. 5, 2011, 6 pgs.

European Office Action for European Patent Application No. 08767750.6, dated Jan. 12, 2011, 6 pgs.

PCT International Search Report for PCT Patent Application No. PCT/US2010/027139, Dec. 6, 2010, 5 pgs.

PCT Written Opinion of the International Searching Authority for PCT Patent Application No. PCT/US2010/027139, Dec. 6, 2011, 6 pgs.

European Office Action for European Patent Application No. 08767751.4, Jan. 14, 2011, 5 pgs.

US Office Action for U.S. Appl. No. 12/209,110 dated Feb. 11, 2011, 20 pages.

US Office Action for U.S. Appl. No. 12/121,649, Apr. 19, 2011, 25 pgs.

US Office Action for U.S. Appl. No. 12/130,821, Feb. 22, 2011, 12 pgs.

US Office Action for U.S. Appl. No. 12/121,634, Mar. 1, 2011, 19 pgs.

US Office Action for U.S. Appl. No. 11/644,638, Apr. 15, 2011, 7 pgs.

European Office Action for European Patent Application No. 09718026.9, Feb. 10, 2011, 3 pgs.

European Office Action for European Patent Application No. 08756664.2, Mar. 17, 2011, 6 pgs.

Michalke, Clemens, et al., "Linear MOMO Receivers vs. Tree Search Detection: A Performance Comparison Overview", IEEE Internatinal Symposium on Personal, Indoor and Mobile Radio Communications, Sep. 11, 2006, pp. 1-7.

Narayanan, K.R., et al., "Low Complexity Turbo Equalization with Binary Coding", IEEE International Conference on Communications, ICC '2000, New Orleans, pp. 1-5, vol. 1.
Hoeher, Peter, "Advances in Soft-Output Decoding", IEEE Global Telecommunications Conference, Nov.-Dec. 1993, pp. 793-797.
PCT International Search Report for PCT Patent Application No. PCT/US2009/035735, dated Jul. 13, 2009, 5 pages.
Written Opinion of the International Searching Authority for PCT Patent Application No. PCT/US2009/035735, dated Jul. 13, 2009, 8 pages.
US Office Action for U.S. Appl. No. 11/644,638, dated Sep. 30, 2010, 24 pages.
Korean Office Action for corresponding Korean Patent Application No. 2008-7025123, dated Sep. 29, 2010, 3 Pgs.
PCT International Preliminary Report on Patentability for PCT Patent Application No. PCT/US2009/035735, dated Sep. 16, 2010, 8 pages.
European Office Action for corresponding European Patent Application No. 07861675.2, dated Jul. 26, 2010, 4 pgs.
US Office Action for U.S. Appl. No. 11/754,903, dated Sep. 20, 2010, 18 pages.
US Office Action for U.S. Appl. No. 11/939,353, dated Sep. 22, 2010, 15 pages.
PCT International Search Report dated Sep. 18, 2008, for PCT/US08/006286, filed May 16, 2008, 4 pages.
Written Opinion of the International Searching Authority dated Sep. 18, 2008, for PCT/US08/006286, filed May 16, 2008, 8 pages.
International Search Report mailed Nov. 6, 2008 for PCT/US08/065675, filed Jun. 3, 2008, 5 pages.
Written Opinion of the International Searching Authority mailed Nov. 6, 2008 for PCT/US08/065675, filed Jun. 3, 2008, 8 pages.
International Search Report for related application WO 08/048651, dated Jun. 25, 2008.
Written Opinion of the International Searching Authority for related application WO 08/048651, dated Jun. 25, 2008.
Communication Relating to the Results of the Partial International Search dated Jan. 31, 2009 for PCT/US07/13074, filed Jun. 1, 2007.
PCT International Search Report dated Apr. 14, 2008 for PCT/US07/23207, 3 pages.
Written Opinion of the International Searching Authority dated Apr. 14, 2008 for PCT/US07/23207, 6 pages.
International Search Report dated Apr. 15, 2008 for PCT/US07/24572, 4 pages.
Written Opinion of the International Searching Authority dated Apr. 15, 2008 for PCT/US07/24572, 6 pages.
PCT International Search Report dated Aug. 20, 2008 for PCT/US08/03274, 4 pages.
Written Opinion of the International Searching Authority dated Aug. 20, 2008 for PCT/US08/03274, 10 pages.
Lattice Semiconductor Corp., "Turbo Decoder", IP Data Sheet, 2003, 6 pages.
Kao, Chien-Yu, "A Bi-directional SOVA with Normalization for Turbo Decoding", Jun. 2006, Tainan, Taiwan, 72 pages.
Cox, Richard V., et al., "Subband Speech Coding and Matched Convolutional Channel Coding for Mobile Radio Channels", IEEE Transactions on Signal Processing, vol. 39, No. 8, Aug. 1991, pp. 1717-1731.
Hagenauer, Joachim, et al., "The Performance of Rate-Compatible Punctured Convolutional Codes for Digital Mobile Radio", IEEE Transactions on Communications, vol. 38, No. 7, Jul. 1990, pp. 966-980.
Lee, Inkyu, et al., "Code Design of Space-Time Bit-Interleaved Coded Modulation Systems For Maximum Diversity", ICC, Jun. 2004, 11 pages.
Taddei, Herve, et al., Mode Adaptive Unequal Error Protection for Transform Predictive Speech and Audio Coders, IEEE, 2002, pp. 165-168.
Higuchi, K., et al., "Adaptive Selection of Surviving Symbol Replica Candidates ased on Maximum Reliability in QRM_MLD for OFCDM MIMO Multiplexing", in Proc. Globecom, Dec. 2004, pp. 2480-2486.

Seshadri, N., et al., "List Viterbi Decoding Algorithms with Applications", IEEE Transactions on Communications, vol. 42, No. 2/3/4, Feb./Mar./Apr. 1994, pp. 313-323.
Kawai, H., et al., "Independent adaptive control of surviving symbol replica candidates at each stage based on minimum branch metric in QRM-MLD for OFCDM MIMO multiplexing", IEEE Vehicular Techonology Conference, VTC2004, vol. 3, Sep. 2004, pp. 1558-1564.
Wong, K.K.Y., et al., "Low-complexity space-time turbo equalizer with the soft-output M-algorithm for frequency-selective channels", IEEE International Conference on Communications, vol. 4, May 2005, pp. 2251-2255.
Wong, K.K.Y., et al., "Bi-directional soft-output m-algorithm for iterative decoding", IEEE International Conference on Communications, vol. 2, Jun. 2004, pp. 792-797.
Kitty, K.Y. Wong, et al., "Soft-Output Trellis/Tree Iterative Decoder for high-order BICM on MIMO Frequency Selective Rayleigh Fading Channels", IEEE International Conference on Communications, Jun. 2006, pp. 4278-4284.
Papadopoulos, H., et al., "Wideband space-time coded systems with non-collocated antennas", Radio and Wireless Symposium, 2008 IEEE, Jan. 22, 2008, pp. 307-310.
Lee, Inkyu, et al., "Diversity Analysis for Space-Time, Bit-Interleaved Coded Modulation Systems", Korea University, Seoul, Korea, Jan. 2007.
Gencata, et al., "Virtual-topology adaptation for WDM mesh networks under dynamic traffic," Proceedings of IEEE Infocom 2002, vol. 1, Jun. 23, 2002, pp. 48-56.
Koetter, R., et al., "Beyond routing: an algebraic approach to network coding," Proceedings of IEEE Infocom 2002, vol. 1, Jun. 23, 2002, pp. 122-130.
Del Re, Enrico, et al., "Next-Generation Mobile Satellite Networks," IEEE Communications Magazine, vol. 40, No. 9, Sep. 1, 2002, pp. 150-159.
Ernest, P.H.H., et al., "An efficient algorithm for virtual topology reconfiguration in WDM optical ring networks," Proceedings of 10th Conference on Computer Communications and Networks, Oct. 15, 2001, pp. 55-60.
Fasolo, E., "Network coding techniques," www.cs.virginia.edu/{yw5s/Network%20coding.ppt, Mar. 7, 2004, pp. 1-14.
Chou, P.A., et al., "Network Coding for the Internet and Wireless Networks", www.eecs.umich.edu/systems/ChouSeminar.ppt, Mar. 28, 2006, pp. 1-29.
Ahlswede, R., et al., "Network Information Flow", IEEE Transactions on Information Theory, IT-46(4), Jul. 2000, pp. 1204-1216.
Ho, T., et al., "The Benefits of Coding Over Routing in a Randomized Setting", in the Proceedings of the International Symposium on Information Theory (ISIT), Jun. 2003, pp. 1-6.
Katti, S., et al., "XORs in the Air: Practical Wireless Network Coding", in the Proceedings of the ACM Special Interest Group on Data Communication (SIGCOMM), Sep. 2006, 12 pages.
Koetter, R., et al., "An Algebraic Approach to Network Coding", IEEE/ACM Transactions on Networking, vol. 11, No. 5, Oct. 2003, pp. 782-795.
Li, S. R., et al., "Linear Network Coding", IEEE Transactions on Information Theory, IT-49(2), Feb. 2003, pp. 371-381.
Chou, P.A., et al., "Practical Network Coding", 51st Allerton Conference on Communication, Control and Computing, Oct. 2003, 10 pages.
Cormen, T.H., et al., "Introduction to Algorithms", 2nd Edition, MIT Press and McGraw-Hill, 2001, pp. 643-700.
Jafarkani, H., "Space-Time Coding, Theory and Practice", Cambridge University Press, 2005.
Yiu, S., et al., "Distributed Block Source Coding", IEEE GLOBECOM 2005 Proceedings, Nov. 2005.
Su, W., et al., "Signal Constellations for Quasi-Orthogonal Space-Time Block Codes with Full Diversity", IEEE Transactions on Information Theory, Oct. 2004, pp. 2231-2347.
Jafarkani, H., "A Quasi-Orthogonal Space-Time Block Code", IEEE Transactions on Communications, Jan. 2001, 4 pages.
Tirkkonen, O. et al.: "Minimal Non-Orthogonality Rate 1 Space-Time Block Code for 3+ Transmit Antennas," IEEE 6th Int. Symp. Spread Spectrum Tech. and Appl., pp. 429-432, Sep. 2000, 4 pages.

Sharma, N. et al.: "Improved Quasi-Orthogonal Codes Through Constellation Rotation," IEEE Trans. Communications, pp. 332-335, Mar. 2003, 3 pages.

Wang, H. et al.: "Upper Bounds of Rates of Space-Time Block Codes from Complex Orthogonal Designs," IEEE Trans. Information Theory, pp. 2788-2796, Oct. 2003, 9 pages.

El Gamal, H. et al., "Distributed Space-Time Filtering for Cooperative Wireless Networks", GLOBECOM'03, Dec. 2003, pp. 1826-1830.

Sezgin, A., et al., "On Exit-Chart Analysis of Coherent and Non-Coherent Space-Time Codes", Smart Antennas, 2004, pp. 49-56.

Horn, R.A., et al., "Matrix Analysis", Cambridge University Press, New York, 1994.

Tse, D., et al., "Fundamentals of Wireless Communication", Cambridge University Press, May 2005.

Stott, J.H., "The DVB Terrestrial (DVB-T) Specification and Its Implementation in a Practical Modem", Proceedings of the 1996 International Broadcasting Convention, IEEE Conference Publication No. 428, Sep. 1996, pp. 255-260.

Guerin, R., et al., "Quality-of-Service in Packet Networks: Basic Mechanisms and Directions", Invited Paper, Computer Networks, vol. 31, No. 3, Feb. 1999, pp. 1-16.

Zhang, H., "Service Disciplines for Guaranteed Performance Service in Packet-Switching Networks", in the Proceedings of the IEEE, vol. 83, No. 10, Oct. 1995, pp. 1-23.

Caire, G., et al., "Achievable Throughput of MIMO Downlink Beamforming and Limited Channel Information", Proceedings of IEEE PIMRC, Aug. 2007.

Medard, M., "The Effect upon Channel Capacity in Wireless Communication of Imperfect Knowledge of the Channel", IEEE Transactions on Information Theory, May 2000, pp. 935-945.

Marzetta, T.L., "How Much Training Is Required for Multi-User MIMO?", ACSSC96, Asilomar Conference Oct. 2006.

Wiswanath, P., et al., "Sum Capacity of the Multiple Antenna Gaussian Broadcast Channel and Uplink-Downlink Duality", IEEE Transactions on Information Theory, Aug. 2003, pp. 1912-1923.

Peel, C.B., et al., "A Vector Pertrubation Technique for Near-Capacity Multi Antenna Multi User Communication, Part I: Channel Inversion and Regularization", IEEE Transactions on Communications, Jan. 2005, pp. 195-202.

Joham, M., et al., "Linear Transmit Processing in MIMO Communications Systems", IEEE Transactions on Signal Processing, Aug. 2005, pp. 2700-2712.

Papadogiannis, et al., "A Dynamic Clustering Approach in Wireless Networks with Multi-Cell Cooperative Processing", IEEE International Conference on Communications, May 19, 2008, pp. 4033-4037.

PCT International Preliminary Report on Patentability for PCT Patent Application No. PCT/US2009/053466, dated Feb. 24, 2011, 9 pages.

PCT International Preliminary Report on Patentability for PCT Patent Application No. PCT/US2009/053471, dated Feb. 24, 2011, 9 pages.

PCT International Preliminary Report on Patentability for PCT Patent Application No. PCT/US2009/054937, dated Mar. 10, 2011, 8 pages.

PCT International Preliminary Report on Patentability for PCT Patent Application No. PCT/US2009/056865, dated Mar. 24, 2011, 12 pgs.

European Office Action for European Patent Application No. 07862325.3, Apr. 7, 2011, 6 pgs.

US Office Action for U.S. Appl. No. 12/538,733, Oct. 18, 2011, 11 pgs.

US Office Action for U.S. Appl. No. 12/538,739, Dec. 7, 2011, 23 pgs.

US Final Office Action for U.S. Appl. No. 12/538,733, Mar. 27, 2012, 6 pgs.

US Final Office Action for U.S. Appl. No. 12/335,409, Mar. 19, 2012, 22 pgs.

PCT International Preliminary Report on Patentability for PCT Patent Application No. PCT/US2010/033549, Nov. 17, 2011, 7 pgs.

US Notice of Allowance for U.S. Appl. No. 11/754,903, Mar. 12, 2012, 8 pgs.

* cited by examiner

Evaluate quality of individual OFDM tones received by a receiver in a wireless communication system
101

Perform a first decoding operation to produce a first set of output data representing most likely decision values for the transmitted bits and reliability values for these decisions, including performing a SOMA-based MIMO detection process over each subtone for disjoint inner demapping, including searching a detection tree for each subtone using a tree-search symbol order that is adapted for each subtone based on channel state information, where only a number of best alternatives from every level of the tree are expanded
102

Perform a second decoding operation with a binary outer coder
103

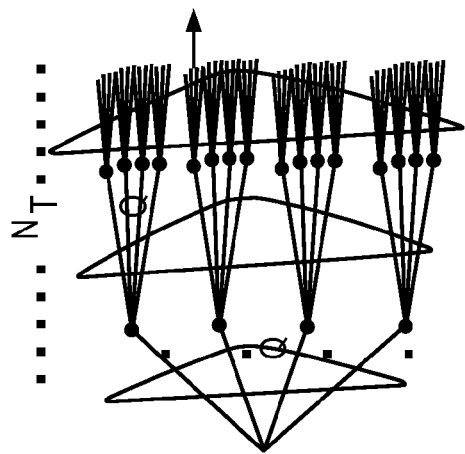

TREE POSITION ADAPTIVE SOFT OUTPUT M-ALGORITHM RECEIVER STRUCTURES

PRIORITY

The present patent application claims priority to and incorporates by reference the corresponding provisional patent application Ser. No. 61/031,077, titled, "Tree Position Adaptive Soft Output M-algorithm Receiver Structures for MIMO/OFDM/QAM Systems with BICM/ID," filed on Feb. 25, 2008.

FIELD OF THE INVENTION

The present invention relates to the field of adaptive reduced-complexity receiver structures for receiving information over wireless systems with multiple transmit antennas and, potentially, multiple receive antennas; more particularly, the present invention relates to, in the baseline system, the case where the transmit antennas are collocated at the same base station.

BACKGROUND OF THE INVENTION

Future wireless systems require efficient utilization of the radio frequency spectrum in order to increase the data rate achievable within a given transmission bandwidth. This can be accomplished by employing multiple transmit and receive antennas combined with signal processing. A number of recently developed techniques and emerging standards are based on employing multiple antennas at a base station to improve the reliability of data communication over wireless media without compromising the effective data rate of the wireless systems. So called space-time block-codes (STBCs) are used to this end.

Specifically, recent advances in wireless communications have demonstrated that by jointly encoding symbols over time and transmit antennas at a base station one can obtain reliability (diversity) benefits as well as increases in the effective data rate from the base station to each cellular user. These multiplexing (throughput) gain and diversity benefits depend on the space-time coding techniques employed at the base station. The multiplexing gains and diversity benefits are also inherently dependent on the number of transmit and receive antennas in the system being deployed, in the sense that they are fundamentally limited by the multiplexing-diversity trade-offs curves that are dictated by the number of transmit and the number of receive antennas in the system.

For high data rates and wideband transmission, the use of OFDM makes the equalizer unnecessary. With multilevel modems, coded modulation systems can easily be designed by use of an outer binary convolutional code and an interleaver in a so called bit-interleaved coded modulation (BICM) system, which is well-known in the art.

There are a number of designs such as coded MIMO/OFDM/BICM/ID systems that include an inner-outer decoder structure, whereby the outer decoder is optimally selected. The designs include the following. These include iterative decoding (ID) receivers with a MAP-based inner decoder, ID systems with a MaxLogMAP-based inner decoder, receivers using a QRD/M-Algorithm based inner decoder, and MMSE-based inner decoders.

Receivers with iterative decoding (ID) and a MAP-based inner decoder use an inner decoder that has the optimum bit-error-rate performance among all inner/outer decoder structures. However, the MAP-based inner decoder becomes computationally intractable as N (number of transmit antennas/number of QAM symbols that need to be jointly resolved) and b (number of bits represented by each QAM symbol) increase.

ID systems with a MaxLogMAP-based inner decoder have lower complexity than the MAP-based system and are asymptotically (high SNR) optimal in that it has near optimum bit-error-rate performance at high SNR. However, the MaxLogMAP-based inner decoder also becomes computationally intractable as N and b increase.

Receivers using a QRD/M-Algorithm based inner decoder use a variant of the M-algorithm to produce hard bit estimates along with reliability information. As a result, they can yield drastic reductions in complexity by proper choice of the M parameter, at a cost in bit-error-rate performance. These methods directly employ the "hard-output" M-algorithm, to generate hard-output estimates, and then employ the resulting M candidates to obtain soft information. However, to generate soft information for any bit location, both values of the bit must be available in the pool of the remaining M candidates. As a result, these methods resort to heuristic (and inferior) softify-ing techniques to generate soft output for each bit and do not exploit iterative decoding.

Iterative receivers with MMSE-based inner decoders have much lower complexity but suffer in bit-error-rate performance, especially, at higher outer-code rates.

Note that these receiver structures are not exhaustive, but rather representative. There exist many other inner decoder structures in the literature, including spherical decoders, soft-output Viterbi-algorithm (SOVA) based inner-decoders, etc.

SUMMARY OF THE INVENTION

A method and apparatus for tree position adaptive SOMA receiver structures are disclosed herein. In one embodiment, a device for use in a wireless communication system comprises a receiver to receive information-bearing signals from the transmitter wirelessly transmitted using OFDM and bit interleaved coded modulation, where the receiver includes an inner decoder structure having a soft output M-algorithm (SOMA) based multiple-in multiple-out (MIMO) joint demapper that uses a SOMA-based MIMO detection process to perform joint demapping over each tone, and wherein the SOMA-based MIMO joint demapper is operable to search a detection tree for each tone using a tree-search symbol order that is adapted for each tone based on channel state information and extrinsic information from the outer decoder, where only a number of best alternatives from every level of the tree are expanded, and to provide soft-output information on each of the bits in the best candidate.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 is a flow diagram of one embodiment of a decoding process.

FIG. 8 illustrates the decision tree that allows a recursive computation of metrics on a tree in the case that there are three transmit antennas.

FIG. 9 illustrates an example of a decision tree.

DETAILED DESCRIPTION OF THE PRESENT INVENTION

Figure 2:
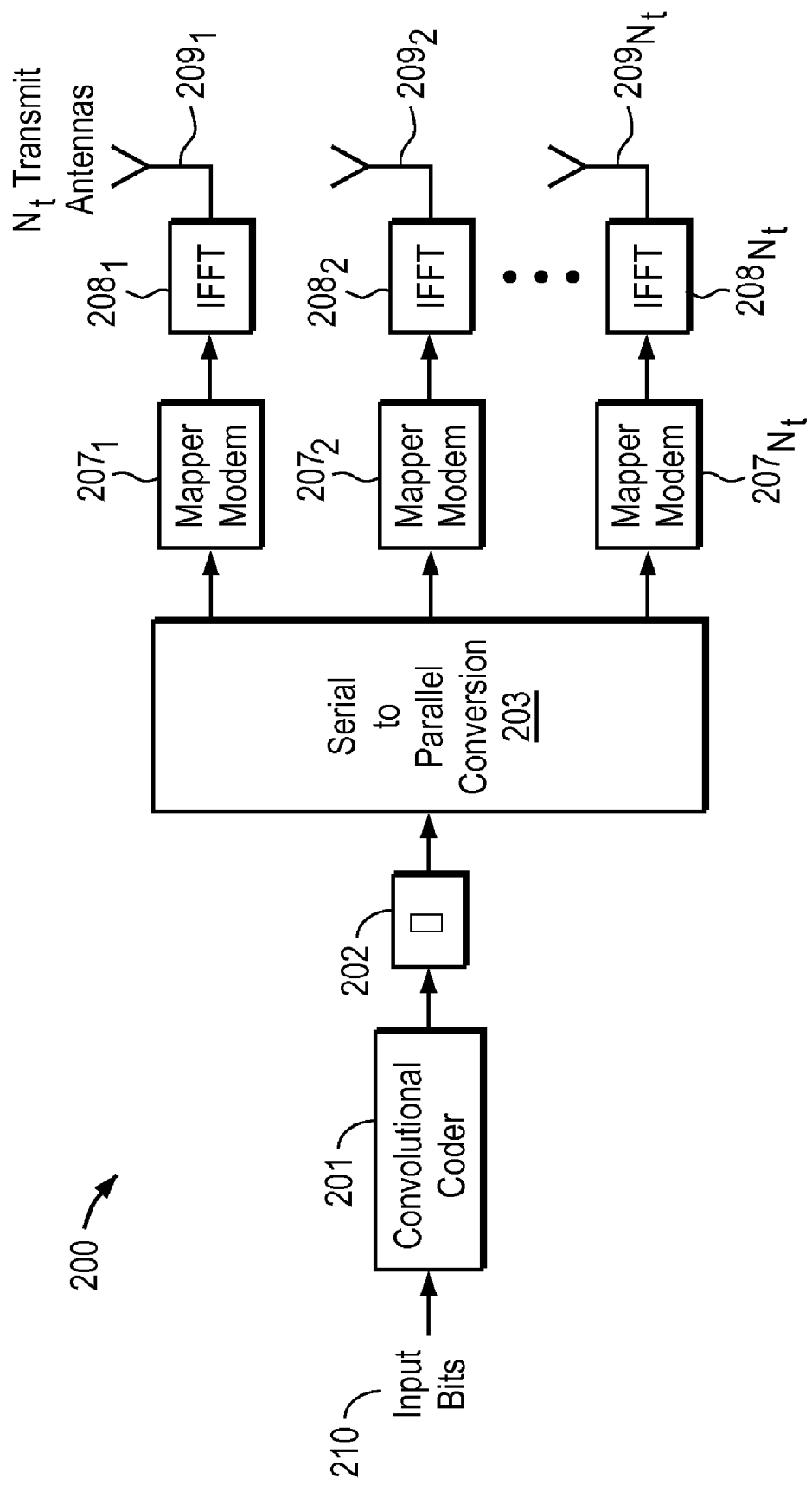
FIG. 2 is a block diagram of one embodiment of a transmitter for space-time coding with bit-interleaved coded modulation (BICM) with OFDM modulation for wideband frequency selective channels.

Methods and apparatuses are disclosed for adaptive reduced complexity receiver structures. In one embodiment, the disclosed techniques deal with receiver complexity reduction for MIMO/OFDM/BICM/ID. The disclosed techniques can also be used with MIMO/OFDM/BICM/ID systems that also employ an inner orthogonal or quasi-orthogonal space-time block code. Also, the transmit antennas need not be collocated, although, typically they are collocated.

In one embodiment, a detection process is associated with the aforementioned transmission systems. This may consist of an inner/outer decoder structure that may also exploit iterative (turbo-like) decoding, where both the inner decoder (MIMO demapper) and the outer decoder perform soft-in soft-out (SISO) detection/decoding. One system component contributing to the complexity is typically the inner decoder, referred to as a joint demapper.

One class of inner-decoder algorithm on which the invention can be applied is the reduced-complexity soft-output MIMO inner-decoder, which makes adaptive use of a modified soft output M-algorithm, (SOMA). This soft-output MIMO detector is applied on every tone or sub-channel in the OFDM system as well as at every iteration in the decoding. The SOMA detector uses only a fraction of the total number of candidates in its MIMO detection process, thus the considerable complexity reduction.

In one embodiment, a set of SOMA algorithms are presented that are based on channel-adaptive tree-search ordering. The full tree without pruning represents all possible combinations of sequences of QAM symbols, where the length of the sequences (or the depth of the tree) is equal to the number of transmitted symbols on the given OFDM tone (which is also equal to the number of transmit antennas). The SOMA algorithm searches intelligently a subset of the full tree. In one embodiment, the tree is setup by ordering the QAM symbols, based on their measured received symbol energy. These received signal level quantities can be extracted from the channel state information (CSI) at the receiver. The symbol with highest received signal energy is placed at the root of the tree, the symbol with second highest received signal energy is placed next, and the remaining symbols in the sequence are chosen in the order of decreasing received energy levels. Then the SOMA in its simplest form can be operated with a fixed value of M, as well as fixed T and I parameters. However, in one embodiment, the above can be combined with adaptations of the M, T, and I parameters as well as adaptations to different SOMA parameters for different OFDM tones, depending on the signal levels of the tones (the received quality of the tones). Note that, although in the described form, the symbol-ordering is performed on a per-tone basis, in principle, it can be extended to block-reordering schemes, whereby the same tree-search order is chosen for a block of tones by comparisons of the received symbol levels or SNRs over the given block of tones. Other comparisons may be performed to determine the tree-search order, such as for example, signal-levels (or SNRs) of the symbols on the detection tree itself.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

A wireless communication system a first device (e.g., a base station) having a transmitter and a second device having a receiver (e.g., a mobile terminal) to receive information-bearing signals from the transmitter wirelessly transmitted using OFDM and bit interleaved coded modulation is described. In one embodiment, the communication system described herein is a coded modulation system that includes transmitters that apply space-time coding with bit-interleaved coded modulation that is combined with a multi-carrier OFDM modulation and receivers that apply OFDM demodulation with iterative demapping and decoding. The systems described herein have $N_t$ transmit antennas and $N_r$ receive antennas. Each of the $N_r$ receive antennas receives signals that are the sum of channel-distorted versions of the signals transmitted from the $N_t$ transmit antennas. Such coded modulation systems in accordance with the present invention may be advantageously employed in wireless local/wide area network (LAN/WAN) applications.

In one embodiment, the space-time coding system described herein comprises OFDM for wideband transmission, MIMO and large QAM constellations for high spectral efficiency, a bit interleaver for the bit-interleaved coded modulation scheme (BICM) and an outer binary code. The overall detection is typically performed iteratively. This requires that both the inner MIMO demapper and the outer decoder perform soft-in soft-out (SISO) detection/decoding. One system component contributing to the complexity is typically the joint demapper as explained above. The outer code is less critical in terms of complexity. In one embodiment, the MIMO detector in principle works with any binary outer code. This code could be a turbo code, an LDPC code, a regular convolutional code or an RCPC code. The decoder for the outer code is preferably a soft-in soft-out (SISO) type decoder, for example a MAP decoder. The outer decoder supplies soft information to the inner MIMO detector for iterative decoding.

While the exemplary embodiment is described for space-time coding with bit-interleaved coded modulation, other types of coded modulation for space-time coding may be used. In addition, the exemplary embodiments are described for a mapping of the bit-interleaved coded data into symbols using QAM; however, other modulation schemes may be used, such as, for example, but not limited to phase-shift keying (PSK).

Generally, the receiver includes circuitry that estimates the values for the elements in channel response matrix H[f], and such estimates may be generated using periodic test (pilot) signals transmitted by the transmitter to the receiver. Such a priori information of the channel impulse response may also be generated via simulations. The matrix H[f] denotes the channel response over the fth OFDM tone and is a matrix of dimensions $N_r$ by $N_t$.

When combined with signal processing, multiple transmit and receive antennas can yield communication links with increased bandwidth efficiency (data rate), extended power efficiency (range), or both. Embodiments of the invention deals primarily with the forward link, i.e., the base-to-mobile transmission direction of transmission. Methods and apparatuses are disclosed for adaptive soft output M-algorithm based receiver structures.

In one embodiment, a reduced complexity soft output MIMO detector in the receiver makes use of a modified soft output M-algorithm (SOMA). In one embodiment, the soft output MIMO detector is applied for every tone or subchannel in the OFDM system, as well as at every iteration in the decoding process. To illustrate the advantages of the SOMA demapper, consider for comparison the optimum MIMO detector, referred to as a maximum a posteriori probability (MAP) detector. The MAP performs a joint demapping function over all the transmit antennas and over all the involved QAM constellation symbols and bits. Consider also for comparison the asymptotically optimum but simpler exhaustive MaxLogMAP detection algorithm. Even in the simpler MaxLogMAP detector an exhaustive demapping operation is required and it involves a search space that is growing exponentially with the product of the number of transmit antennas ($N_t$) and the number of bits per QAM constellation point (B). For example, with a 6 by 6 MIMO system (6 transmit antennas and 6 receive antennas) using 64 QAM modulation (6 bits per constellation point) this product is 36. In such a case, the decoding complexity is of the order of $2^{36}$, and the MaxLogMAP cannot be implemented with the technology of today. In contrast, in one embodiment, the SOMA detector only uses a fraction of the total number of candidates in its MIMO detection process, thus the considerable complexity reduction. There is of course a tradeoff between the performance and the degree of complexity reduction.

In one embodiment, as described in further detail below, the SOMA is used adaptively, in that the tree-search symbol order when performing a detection search is adapted by each SOMA module (one per OFDM tone) according to the channel conditions (on the given OFDM tone) in order to optimize the overall complexity-performance trade-offs of the receiver. More specifically, during every inner/outer decoder iteration, a SOMA detector performs a SOMA detection process on each OFDM tone. In one embodiment, the number of candidates explored in the SOMA detection process is controlled by the parameter (M) that indicates the number of paths that are extended from each node or level in the detection tree. In particular, at any given level in the detection tree, only a subset M of the visited candidates are kept as survivors and are going to be extended at the next level. The rest of the candidates tested at this level are referred to as early-terminated paths. The early terminated paths are used by the SOMA for performing soft-output calculations. In one embodiment, the number of early terminated paths that are explored in the SOMA detection process is also an adaptation parameter as these paths also play a role in the soft output calculations. For purposes herein, this value is denoted T and is used in the soft output value calculation by the algorithm. In the overall detection process the number of inner/outer decoder iterations, I, also affects the total decoding complexity and the associated performance.

In one embodiment, an OFDM based system with one MIMO detector for each tone, where the complexity reduction in the SOMA based detector is implemented adaptively for each tone by use of symbol reordering followed by a SOMA-based decoder. In one embodiment, the reordering process is a relatively simple procedure based on CSI that is collected at the receiver (regardless of whether or not tree reordering is performed). The SOMA decoder employed over each tone can be fixed (using fixed M, I, T parameters) or it can be channel adaptive. The M value used in the SOMA tree may be fixed or it may vary over the decoding tree. In such a system, a MaxLogMAP, improved MaxLogMAP metric or any modified/corrected MaxLogMAP metric can be employed.

FIG. 1 is a flow diagram of one embodiment of a decoding process. The process may be performed by processing logic that may comprise hardware (e.g., dedicated logic, circuitry, etc.), software (such as is run on a general purpose computer system or a dedicated machine), or a combination of both. In one embodiment, the decoding process is performed by a receiver in the wireless communication system.

Referring to FIG. 1, the process begins by processing logic evaluating quality of individual OFDM tones received by a receiver in a wireless communication system (processing block 101). The quality of the individual OFDM tones/subchannels is evaluated/estimated at the receiver. In one embodiment, the quality of OFDM tones is based on received symbol signal level. In another embodiment, the quality of OFDM tones is based on signal-to-noise ratio (SNR). Note that the terms "tones" and "subtones" are used interchangeably herein.

After evaluating the quality of OFDM tones, processing logic performs a first decoding operation to produce a first set of output data representing most likely decision values for the transmitted bits and reliability values for these decisions, including performing a SOMA-based MIMO detection process over each tone for disjoint inner demapping by searching a detection tree for each tone using a tree-search symbol order that is adapted for each tone based on channel state information, where only a number of best alternatives from every level of the tree are expanded (processing block 102). In one embodiment, the SOMA-based MIMO detection process produces soft-output information for each bit. As part of the process, the SOMA-based MIMO detection identifies a best candidate among a number of candidates. This produces hard output, i.e., hard value estimates (1s and 0s) for all bits in the N QAM symbols.

In one embodiment, the channel state information criterion comprises estimated received symbol energy with the symbol with the highest symbol energy being at the root of the tree, the symbol with the next highest energy being next in the tree, and with the remaining symbols being in the tree according to decreasing energy levels. In one embodiment, the channel state information criterion corresponds to signal-to-noise ratio (SNR) criterion. In another embodiment, the channel state information criterion used for symbol ordering on the tree corresponds to the SNR of each symbol during the tree search. In particular, all symbols are initially considered as the first symbol on the tree, and the symbol yielding the highest SNR at the first level of the tree is chosen as the symbol at the first level of the tree. Then all the remaining symbols are considered at the second level of the tree, and the symbol with the highest SNR at the second level is chosen to be the symbol at the second level of the tree. This process continues until the full tree symbol-order is chosen. In one embodiment, an inner decoder structure is included in the demapper and comprises a controller to select the tree-search order given a channel matrix. In one embodiment, the controller selects the tree search symbol order by iteratively selecting among the symbols. In one embodiment, the tree-search symbol order is selected for a group of two or more tones. In one embodiment, each tone is an OFDM tone.

In one embodiment, a soft-in soft-out (SISO) outer decoder uses the soft output values from the inner SOMA-based MIMO joint demapper to produce output data and feeds soft values back to the inner decoder structure for iterative decoding. In another embodiment, a soft-input hard-output Viterbi decoder uses the soft output values from the inner SOMA-based MIMO joint demapper to produce hard output data for non-iterative decoding. Note that in such a case, a simpler outer decoder is used to produce the hard outputs.

After performing the first decoding operation, processing logic performs a second decoding operation with a binary outer coder (processing block 103). In one embodiment, the outer decoder comprises a MAP decoder for the associated binary code used as an outer encoder in the transmission system. The outer decoder may comprise a conventional optimal or suboptimal decoder for a conventional convolutional code, a rate-compatible punctured convolutional (RCPC) code, a turbo code, or an LDPC code, when such a binary code is used as an outer encoder in the transmission system.

In one embodiment, the parameters M and T and/or I are selected adaptively for the best overall performance for a given total complexity level, with the quantity that guides the adaptivity being the quality of the different OFDM tones. For example, a high signal level or alternatively a large signal to noise ratio (SNR) for a certain tone means a good quality level for that tone. In such a case, the SOMA detection process performs decoding with a lower value of M, a lower value of T and potentially a lower value of I. On the other hand, for a tone of poor quality, i.e. a tone with low signal level or low SNR, the SOMA detection process performs decoding with higher values of M, T and I for the best use of the overall complexity. The adaptivity can also be extended over time, i.e. over successive OFDM symbols.

Transmitter and Receiver Embodiments

Figure 3:
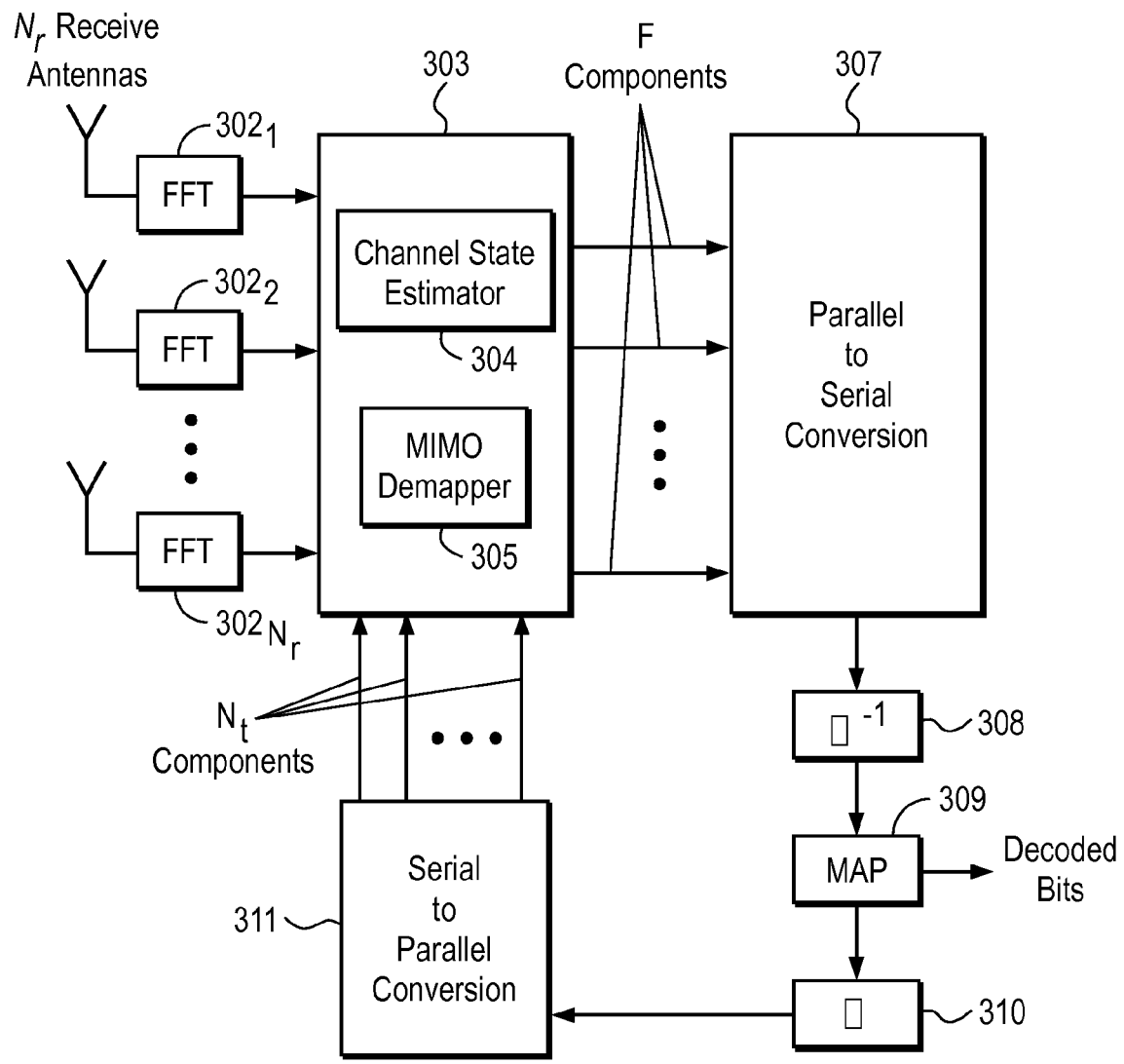
FIG. 3 is a block diagram of one embodiment of a receiver having an iterative decoder for the coded OFDM system shown in FIG. 2.

FIGS. 2 and 3 show the transmitter and receiver block diagrams for a MIMO/OFDM system with BICM and ID. More specifically, FIG. 2 is a block diagram of one embodiment of a transmitter for space-time coding with bit-interleaved coded modulation (BICM) with OFDM modulation for wideband frequency selective channels. Referring to FIG. 2, transmitter 200 comprises (as an example) convolutional encoder 201, bit interleaver 202, serial-to-parallel converter 203, mapper modems $207_1$-$207_{Nt}$, inverse fast Fourier transform (IFFT) modules $208'$-$208_{Nt}$, and transmit antennas $209_1$-$209_{Nt}$. Note that IFFT modules $208_1$-$208_{Nt}$ also include circular-prefix operations, which are performed in a manner that is well known in the art. Also the resulting sequences generated by the IFFT/circular prefix modules are converted into electrical continuous-time signals via pulse-amplitude modulation in a manner that is well known in the art.

To perform BICM encoding to the data, convolutional coder 201 applies a binary convolutional code to the input bits (input data) 210. Bit interleaver 202 then interleaves the encoded bits from convolutional coder 201 to generate bit-interleaved encoded bits. This bit interleaving de-correlates the fading channel, maximizes diversity, removes correlation in the sequence of convolutionally encoded bits from convolutional coder 201, and conditions the data for increased performance of iterative decoding. Convolutional coder 201 and bit interleaver 202 may typically operate on distinct blocks of input data, such as data packets.

After performing bit interleaving, bit-mapping and modulation and OFDM are applied to the bit-interleaved encoded bits. Serial-to-parallel converter 203 receives the serial bit-interleaved encoded bit stream from bit interleaver 202. Note that serial-to-parallel converter 203 may include a framing module (not shown) to insert framing information into the bit stream, which allows a receiver to synchronize its decoding on distinct blocks of information. Serial-to-parallel converter 203 generates a word of length $N_t$ long, with each element of the word provided to a corresponding one of mapper modems $207_1$-$207_{Nt}$. Elements of the word may be single bit values, or may be B bit values where B is the number of bits represented by each modem constellation symbol.

Each of mapper modems $207_1$-$207_{Nt}$ converts B bits to corresponding symbols (of the Q-ary symbol space, with $Q=2^B$). The output of each modem mapper 207 is a symbol. Each of IFFT modules $208_1$-$208_{Nt}$ collects up to F symbols, and then applies the IFFT operation of length F to the block of F symbols. F is an integer whose value can typically range from as small as 64 to 4096, or larger and depends on the available transmission bandwidth, the carrier frequency, and the amount of Doppler shifts that need to be accommodated by the system. Thus, each of IFFT modules $208_1$-$208_{Nt}$ generate F parallel subchannels that may be transmitted over corresponding antennas $209_1$-$209_{Nt}$. Each subchannel is a modulated subcarrier that is transmitted over the channel.

Figures 5, 6:
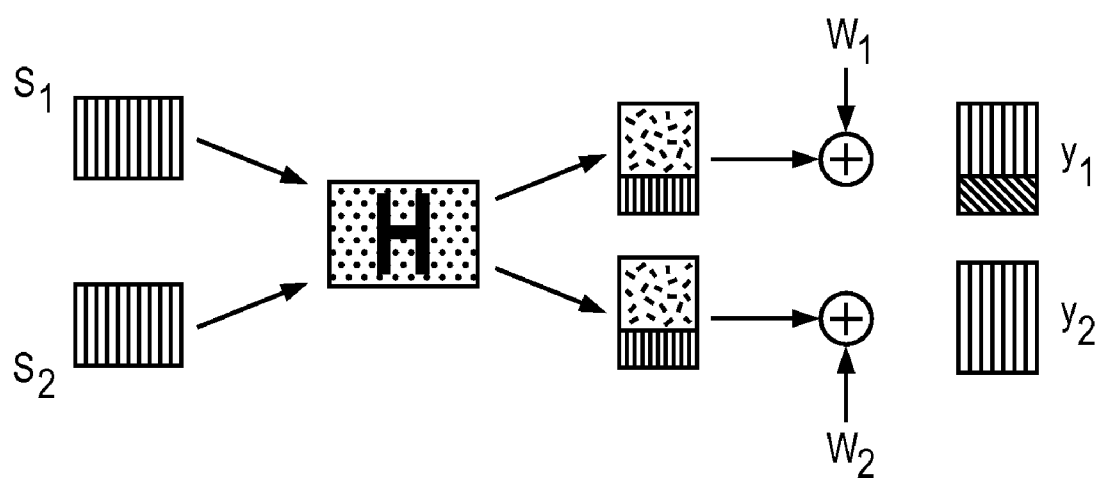
FIG. 5 illustrates a set partition type mapper for 16QAM.
FIG. 6 illustrates the effect of the channel on the transmitted symbols on one OFDM tone, represented as a multiplication of the symbol vector transmitted by the transmit antennas with a matrix H, comprising the channel coefficients between transmit and receive antennas on that OFDM tone.

In embodiment, the transmitter and receivers have an equal number of transmit and receive antennas, i.e., $N_t=N_r=N$. The binary information-bearing signal, hereby denoted as $u_k$, is encoded first at the transmitter by an outer binary code using convolutional coder 201, generating a coded sequence $c_k$. This sequence is interleaved by a pseudorandom bit interleaver 202. Then, each of mapper modems $207_1$-$207_{Nt}$ maps groups of B interleaved bits at a time into $2^B$-QAM symbols. The resulting QAM symbols are multiplexed through the $N=N_t$ transmit antennas $209_1$-$209_{Nt}$ in a round-robin fashion and OFDM transmission is applied over each antenna using IFFT modules $208_1$-$208_{Nt}$. For convenience, for purposes herein, $s_k[n]$, the QAM symbol transmitted by antenna k on tone n, and via $b_k^l[n]$ the lth out of the B bits is used as input in one of mapper modems $207_1$-$207_{Nt}$ to produce $s_k[n]$. Letting $b_k^1[n]=[b_k^2[n], b_k^2[n], \ldots, b_k^B[n]]$, then, $$s_k[n]=\mathrm{map}(b_k[n]) \quad (1)$$

where map denotes the mapper operation. FIG. 5 shows such a mapping for B=4.

FIG. 3 is a block diagram of one embodiment of a receiver having an iterative decoder for the space-time code for the OFDM system. Referring to FIG. 3, receiver 300 comprises receive antennas $301_1$-$301_{Nr}$, fast Fourier transform (FFT) modules $302_1$-$302_{Nr}$, demodulator/detector 303, parallel-to-serial converter 307, bit deinterleaver 308, maximum a posteriori (MAP) decoder 309, bit interleaver 310, and serial-to-parallel converter 311. Although not shown, each of the FFT modules $302_1$-$302_{Nr}$ is preceded by front end that performs filtering, sampling, and a circular-prefix-removal operation.

Receiver 300 performs OFDM demodulation for each of receive antennas $301_{1\text{-}Nr}$, and the demodulation and demapping is performed over F parallel subchannels. The ith receive antenna 301(i) senses a signal made up of various contributions of the signals transmitted from the $N_t$ transmit antennas (i.e., contributions of the multiple F parallel, narrowband, flat fading subchannels transmitted over corresponding antennas $209_1$-$209_{Nt}$ of FIG. 2). In one embodiment, once the electrical signal is sensed by a receive antenna, the signal is downconverted and demodulated, low or bandpass filtered, sampled, and then FFT/circular prefix removal steps are performed.

Each of FFT modules $302_1$-$302_{Nr}$ apply an F-point FFT to the corresponding signals of receive antennas $301_1$-$301_{Nr}$, generating $N_r$ parallel sets of F subchannels.

In one embodiment, detector 303 estimates bits in each of the F subchannels rather than in only one subchannel. Detector 303 includes channel state estimator 304 to determine channel state information, which is typically obtained/estimated via pilot transmission, and multi-input, multi-output (MIMO) demapper 305. MIMO demapper 305, based on the $N_r$ parallel sets of F subchannels from FFT modules $302_1$-$302_{Nr}$, produces soft estimates of the demapped bits (i.e., bits mapped from the constellation symbol) in each of the F subchannels from the $N_t$ antennas in the transmitter. MIMO demapper 305 produces the estimates of the demapped bits and reliability information about these bits using reliability information generated by soft-output decoding (followed by reinterleaving) by MAP decoder 309.

In one embodiment, MIMO demapper 305 computes soft values for bits transmitted on each of the non-overlapping F subchannels, along with an estimate (approximation) of the a posteriori probability of the soft value being correct.

Figure 4:
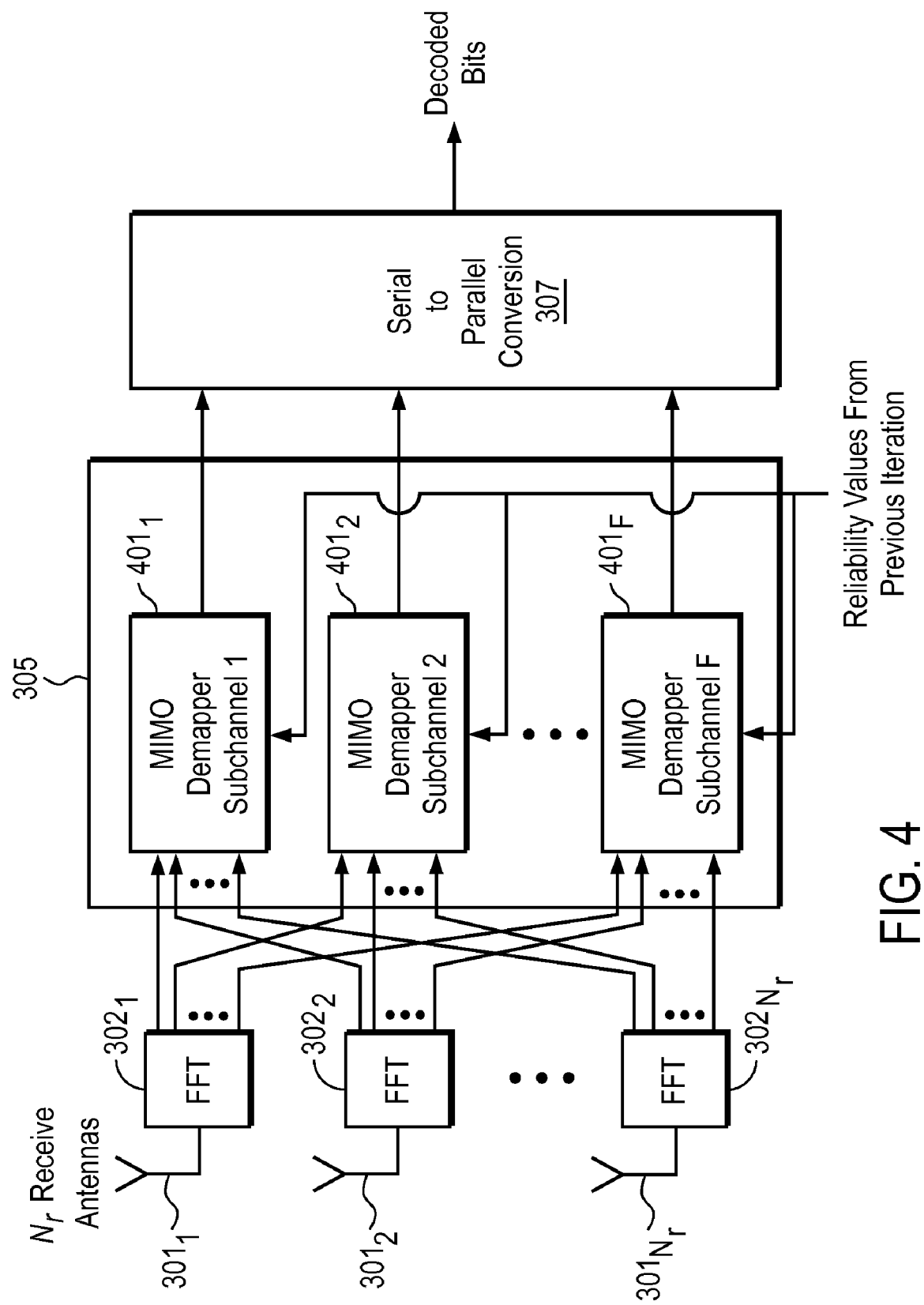
FIG. 4 is a block diagram of one embodiment of the MIMO demapper having MIMO joint demapper units with different SOMA detectors for the different OFDM tones for the MIMO/OFDM system with BICM/ID.

FIG. 4 is a block diagram of one embodiment of MIMO demapper 305 having MIMO joint demapper units for the different OFDM tones/subchannels. Referring to FIG. 4, each signal of the $N_r$ receive antennas $301_1$-$301_{Nr}$ is divided into F subchannels (via demodulator 304, not shown in FIG. 4) by applying the FFT and sent to corresponding subchannel MIMO demappers $401_1$-$401_F$. The signal outputs of the kth subchannel for all $N_r$ receive antennas are provided to the kth subchannel MIMO demapper 401(k). After the first iteration, reliability information is provided to the kth subchannel MIMO demapper 401(k), using extrinsic information generated by the output of MAP decoder 309 at the previous iteration. The extrinsic information is exchanged between MIMO demapper 305 and MAP decoder 309 to improve the bit-error-rate performance at each iteration. Methods for computing the extrinsic information in such inner/outer decoder settings are well-known in the art. In the first iteration, there is no extrinsic information input to the soft demapper. In subsequent iterations, in one embodiment, the extrinsic information is computed as follows. First, the soft-output is computed by the MAP outer decoder, and from it the input reliability information (input to the same outer decoder) is subtracted off in order to compute the extrinsic information produced by MAP decoder 309. This extrinsic information is deinterleaved and passed as input to MIMO demapper 305 in the next iteration.

Returning to FIG. 3, the estimates of bits in F parallel streams from MIMO demapper 305 together with reliability values for those bits are provided to parallel-to-serial converter 307 along with the extrinsic reliability information on each one of these bits. The reliability information is computed as the difference between the output reliability values for those bits (produced by demapper 305) and the input reliability values for those bits (inputs to demapper 305). The converter 307 reconstitutes the estimate of the BICM encoded bit stream generated by the transmitter, which was estimated by the receiver 300. The estimated BICM encoded bit stream (and the extrinsic reliability information) is then deinterleaved by bit deinterleaver 308 and applied to MAP decoder 309 to reverse the convolutional encoding applied by the transmitter. The reverse operation in this case corresponds to generating estimates of the bit values of the information bit stream that is the input to convolutional coder 201, and also producing extrinsic information that is to be passed back (after reinterleaving) to MIMO demapper 303 as new reliability information.

The MAP decoding process generates soft output values for the transmitted information bits in a manner that is well known in the art.

The extrinsic information from MAP decoder 309 is first applied to bit interleaver 310. Bit interleaving aligns elements of the extrinsic information with the interleaved estimated BICM encoded bit-stream from MIMO demapper 305. In addition, the interleaved extrinsic information is applied to serial-to-parallel converter 311, which forms Nt parallel streams of extrinsic information corresponding to the parallel bit streams formed at the transmitter.

The extrinsic information is exchanged between MIMO demapper 305 and MAP decoder 309 to improve the bit error rate performance at each iteration. In one embodiment, a MaxLogMAP-type approximation is used to compute bit-LLR values for each bit location. In another embodiment, an improved Max-Log approximation for calculation of LLRs can be used in both MIMO demapper 305 and in MAP decoder 309 associated with the convolutional code used as an outer encoder in the transmission scheme. The improved Max-Log approximation for calculation of a posteriori LLR values may employ the max* term relationship of the following equation:

$$\max^*(x,y) = \log(e^x + e^y) = \max(x,y) + \log(1 + e^{-|x-y|})$$

when calculating updated forward recursive, reverse recursive, and branch metrics sequences to calculate the LLR. Each constituent MIMO demapper 305 or MAP decoder 309 thus calculates the max* term by separate calculation of a max term ($\max(x,y)$) and a logarithmic correction term ($\log(1+e^{-|x-y|})$).

FIG. 5 illustrates one embodiment of a so called set partition type mapper for 16QAM for use in iterative decoding. This type of mapper may be suitable for BICM with iterative decoding (ID) in contrast to the Gray mapper, which is always suitable for a non-iterative decoding process.

An Example of an Inner Decoder Structure

After OFDM front-end preprocessing, the samples from each receive antenna and on each tone are passed through an inner/outer soft-in soft-out decoder structure for decoding shown in FIGS. 3 and 4, which are described above. Also as described above, in one embodiment, the outer decoder is an optimal (soft-in soft-out) BCJR decoder. The complexity of the near-optimal receivers associated with these types of coded OFDM/BICM/OFDM systems resides in the inner decoder of the receiver structure in FIG. 3. The received signal sample on the mth receive antenna and the nth tone can be expressed as $$y_m[n] = \sum_k h_{km}[n] s_k[n] + w_m[n] \qquad (2)$$

where $h_{mk}[n]$ denotes the effective channel gain between the kth transmit and the mth receive antenna on the nth tone, $w_m[n]$ denotes the associated thermal noise term on the mth antenna and nth tone. Alternatively, (2) can be compactly re-expressed as follows, $$y[n] = H[n]s[n] + w[n] \qquad (3)$$

where $h[n] = [h_1[n]\ h_2[n]\ \ldots\ h_N[n]]^T$ with $h_m[n] = [h_{1m}[n]\ h_{2m}[n]\ \ldots\ h_{Nm}[n]]^T$, and where $s[n] = [s_1[n]\ s_2[n]\ \ldots\ s_N[n]]^T$, and y[n] and w[n] are similarly defined and where it is assumed that $N_t = N_r = N$.

It is assumed that channel state information (CSI) is not available at the transmitter, but CSI is fully available at the receiver; that is, the set of H[n]'s are assumed to be known at the receiver but not at the transmitter.

On each OFDM tone, N QAM symbols are transmitted simultaneously and each of the N receive antennas receives a linear combination of these N symbols (whereby the linear combination is dictated by the instantaneous channel coefficients).

As stated above, in one embodiment, the receiver uses a modified version of the soft output M-algorithm (SOMA). The SOMA is well known in the art; see, for example, Wong, "The Soft Output M-algorithm and its applications", Ph.D. Thesis, Queens University, Kingston, Canada, August 2006, incorporated herein by reference. In one embodiment, the modified soft output M-algorithm (SOMA) is used adaptively. The M-algorithm is well known in the art and is described in Lin & Costello, "Error Control Coding, $2^{nd}$ Edition," Prentice Hall, New York, 2003.

In contrast to the basic M-algorithm which does not give soft output values, in one embodiment, the joint demapper uses the modified SOMA for finding the best alternative among an exponentially growing population of candidates by doing a reduced search in a detection tree. This is done by expanding only the M best alternatives from every level of the tree rather than all alternatives. In one embodiment, the M best alternatives are determined using a metric. In one embodiment, the metric is so called MaxLogMAP type metric, such as described in Lin & Costello, "Error Control Coding, $2^{nd}$ Edition," Prentice Hall, New York, 2003, which is well-known in the art.

Based on the search through the detection tree, the joint demapper calculates soft output values by comparing the estimated best path with the best alternative paths branching off the best path. These paths through the levels of the tree could be terminated at the end of the tree (there are M such paths) or non-terminated at every level (there are T early-terminated paths). That is, the SOMA detection process performs these soft output calculations iteratively during the tree search in the algorithm, whereby at each depth in the tree it uses early terminated paths at that depth and the best candidate at the same depth for computing reliability values for all the bit locations that is possible.

The soft output values from the inner SOMA-based MIMO joint demapper are then used by the soft-in soft-out decoder for the outer binary code. This decoder in turn feeds soft values back to the inner decoder in an iterative turbo-type iterative decoding. In another embodiment, a soft-input hard-output Viterbi decoder (i.e., a simpler outer decoder) uses the soft output values from the inner SOMA-based MIMO joint demapper to produce hard output data for non-iterative decoding.

The inner decoder is channel-adaptive since the symbol order is determined by the channel on the given tone. Such channel-adaptive versions of SOMA inner decoders save in complexity (with respect to the base SOMA designs) without appreciable reduction in performance, as well as being optimizable for a given channel realization to a desired target BER performance.

In one embodiment, the SOMA algorithm computes (estimated) symbol decision values and reliability information for the associated bit estimates by first turning the computation above into a computation on a tree and then performing approximate maximization computations by limiting the search through the tree.

Next the focus is on the SOMA operating on a fixed but arbitrary OFDM tone n. For convenience we omit the dependence of all variables vectors and matrices on the OFDM index, n. In one embodiment, the mapping of the MaxLog-MAP demapper computations on a tree structure is based on exploiting the QR-type decompositions of the channel matrix is described. Let $\pi: \{1, \ldots, N\}: \{1, \ldots, N\}$ denote a permutation function, $s^{(\pi)} = [s_{\pi(1)} s_{\pi(2)} \ldots s_{\pi(N)}]^T$ denote the associated N-symbol permutation of s, and $P^{(\pi)}$ denote the associated permutation matrix, i.e., the matrix yielding $s^{(\pi)} = P^{\pi} s$.

Figure 12:
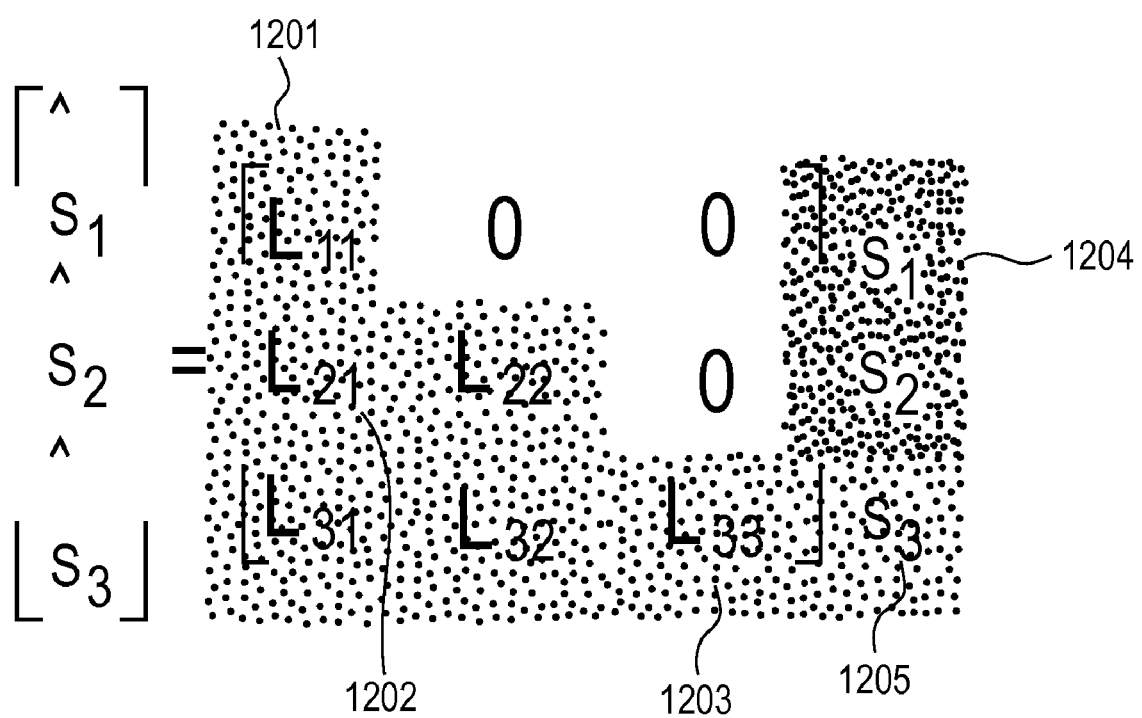
FIG. 12 illustrates the result of a QR decomposition (where the contribution of noise from the right hand side of the equation has been omitted).

Associated with any fixed order $\pi$, the decomposition expresses the channel matrix H from equation (3) as $H^{(\pi)} = H[P^{(\pi)}]^T$ in the form $H^{(\pi)} = Q^{(\pi)} L^{(\pi)}$ with $Q^{(\pi)}$ unitary and $L^{(\pi)}$ lower triangular. As a result, the information lossless projection operation of y onto $[Q^{(\pi)}]^H$ yields a vector $\tilde{y}$ that constitutes a set of measurements that are equivalent to those in y from equation (3) and which can be represented as follows $$\tilde{y} = L^{(\pi)} s^{(\pi)} + \tilde{w}. \quad (4)$$

whereby $l_{ij}^{(\pi)} = \{L^{\pi}\}_{i,j}$, and $l_{ij}^{(\pi)} = 0$ when $i > j$. See FIG. 12 for an example, where the structure of the first term in the right hand side of equation (4) is illustrated for $N_t = N_r = N = 3$.

Given an equation for $\tilde{y}$ given above, the full-search Max-LogMAP can be readily implemented based on the above set of measurements via a search on a tree. At depth k in the tree, only the k first equations are considered from equation (4) to rank candidates. As these equations depend only on the k first symbols in $s^{(\pi)}$, the sets of candidates are ranked in groups whereby each group corresponds to all the N-symbol candidates that have the same symbol values in the first k symbols in the order described by $\pi$. In particular, letting $\tilde{s}$, denote an arbitrary N×1 vector of $2^B$ QAM symbol values, $\tilde{s}_m = [\tilde{s}]_m$, and $\{\tilde{b}_m^1, \tilde{b}_m^2, \ldots, \tilde{b}_m^B,\}$ denote the associated values of the kth bits that map to $\tilde{s}_m$, the MaxLogMAP computation reduces to $$L(\tilde{b}_m^k) = \max_{\tilde{s}: \tilde{b}_m^k=1} \Gamma(\tilde{s}, \hat{s}) - \max_{\tilde{s}: \tilde{b}_m^k=0} \Gamma(\tilde{s}, \hat{s}) \quad (5)$$

where $\hat{s} = [L^{(\pi)}]^{-1}$ and $$\Gamma(\tilde{s}, \hat{s}) = \sum_{m=1}^{N} \left\| l_{mn}^{(\pi)}(\tilde{s}_m - \hat{s}_m) + \sum_{n=1}^{m-1} l_{mn}^{(\pi)}(\tilde{s}_n - \hat{s}_n) \right\|^2 \quad (6)$$

The quantities $\Gamma(\tilde{s}, \hat{s})$ can be readily implemented recursively via a full tree-search on a tree of depth N and $2^B$ branches per node.

The SOMA algorithm, in essence, performs a limited Max-LogMAP-metric based search on the tree. Like any M-algorithm, from all surviving candidates at any given level, all possible candidates are expanded to the next level ($2^B M$ in this case), but only a subset M of those is kept for search at higher depths in the tree. An important element of the SOMA is that it recursively generates and updates quality metric estimates for each value of each of the NB bits represented on the tree. In particular, it exploits the use of two N×B matrices $\Delta^{(0)}$ and $\Delta^{(1)}$, whereby the relative reliability metrics associated with the values 0 and the 1 of the kth bit in $s_m$ are given by $\delta^{(0)}_{m,k} = [\Delta^{(0)}]_{m,k}$ and $\delta^{(1)}_{m,k} = [\Delta^{(1)}]_{m,k}$, respectively. The scheme relies on recursively extending each surviving path at level m to its $2^B$ path extensions at the next level, computing the cumulative metrics for the new paths and sorting the paths in the order of decreasing metrics. If $p_{[l,i],r}$ denote the rth ranked path at depth I, then the M top paths, i.e., the paths in the set $\{p_{[l,i],r}; 1 \leq r \leq M\}$ are retained, while the paths in $\{p_{[l,i],r}; r > M\}$ are terminated. However, a subset of the best $N_{term}$ terminated paths $\{p_{[l,i],r}; M+1 \leq r \leq M+N_{term}\}$ are still used before they are discarded for producing relative reliability updates for the bits and bit values they represent by updating the associated locations in $\Delta^{(0)}$ and $\Delta^{(1)}$ (note that T and $N_{term}$ are used interchangeably herein to denote the number of terminated paths). After the completion at depth N, the SOMA first chooses the surviving length-N path with the best accumulated metric as the hard estimate. This N×1 vector of QAM symbol estimates is used to directly demap and obtain hard estimates for the NB bits $\{\tilde{b}_m^k; 1 \leq k \leq B, 1 \leq m \leq N\}$. Reliability metrics are updated in the two matrices based on all length N tree candidates $2 \leq r \leq M = N_{term}$. Then the relative reliability information for the kth bit represented in the mth QAM symbol is given by $$L(\tilde{b}_m^k) = [2 \tilde{b}_m^k - 1] \delta_{m,k}^{(1 - \tilde{b}_m^k)} \quad (7)$$

The values of M (surviving candidates per depth) and N-term (the number of candidates used for gathering soft information based on early terminated paths) can be varied to trade off computation complexity with bit-error-rate performance. In the iterative decoding setting, in each iteration cycle, each decoder computes extrinsic information that is passed as input (appropriately deinterleaved in the case of the MIMO demapper, and reinterleaved in the case of the outer MAP decoder) to the other decoder. The extrinsic information is computed as the difference between the soft output information produced by the decoder (e.g., in the case of MIMO demapper see equation (7)), and the input intrinsic information to the decoder. Typically, the extrinsic information passed between decoders for any given particular bit location is in the form of differential values, that is the difference between the "bit=1" value and the "bit=0" reliability value. If iterative decoding is used, the metric used for SOMA decoding shown in equation (6) is modified to include an extrinsic term. In particular, another term is added to the right hand side of equation (6), which is a sum of terms, one term for each bit location in the binary representation of the symbol $\tilde{s}$. When differential reliability values are employed, the term added that corresponds to any given, but fixed, bit location, equals zero if the bit-value of that bit location in $\tilde{s}$ is 0, and equal to the differential input reliability value otherwise.

FIG. 6 illustrates the operation of the MIMO demapper for one tone for a simple 2×2 example. Referring to FIG. 6, the $y_1$ and $y_2$ signals are generated from the symbols $s_1$ and $s_2$ from first and second antennas. This occurs in a well-known fashion according to the following:

$$\begin{bmatrix} y_1 \\ y_2 \end{bmatrix} = \begin{bmatrix} H_{11} & H_{12} \\ H_{21} & H_{22} \end{bmatrix} \begin{bmatrix} s_1 \\ s_2 \end{bmatrix} + \begin{bmatrix} w_1 \\ w_2 \end{bmatrix}$$

In this case, s is a vector of size $N_t = N_r = N = 2$, and each entry of s corresponds to a constellation symbol.

Figure 7:
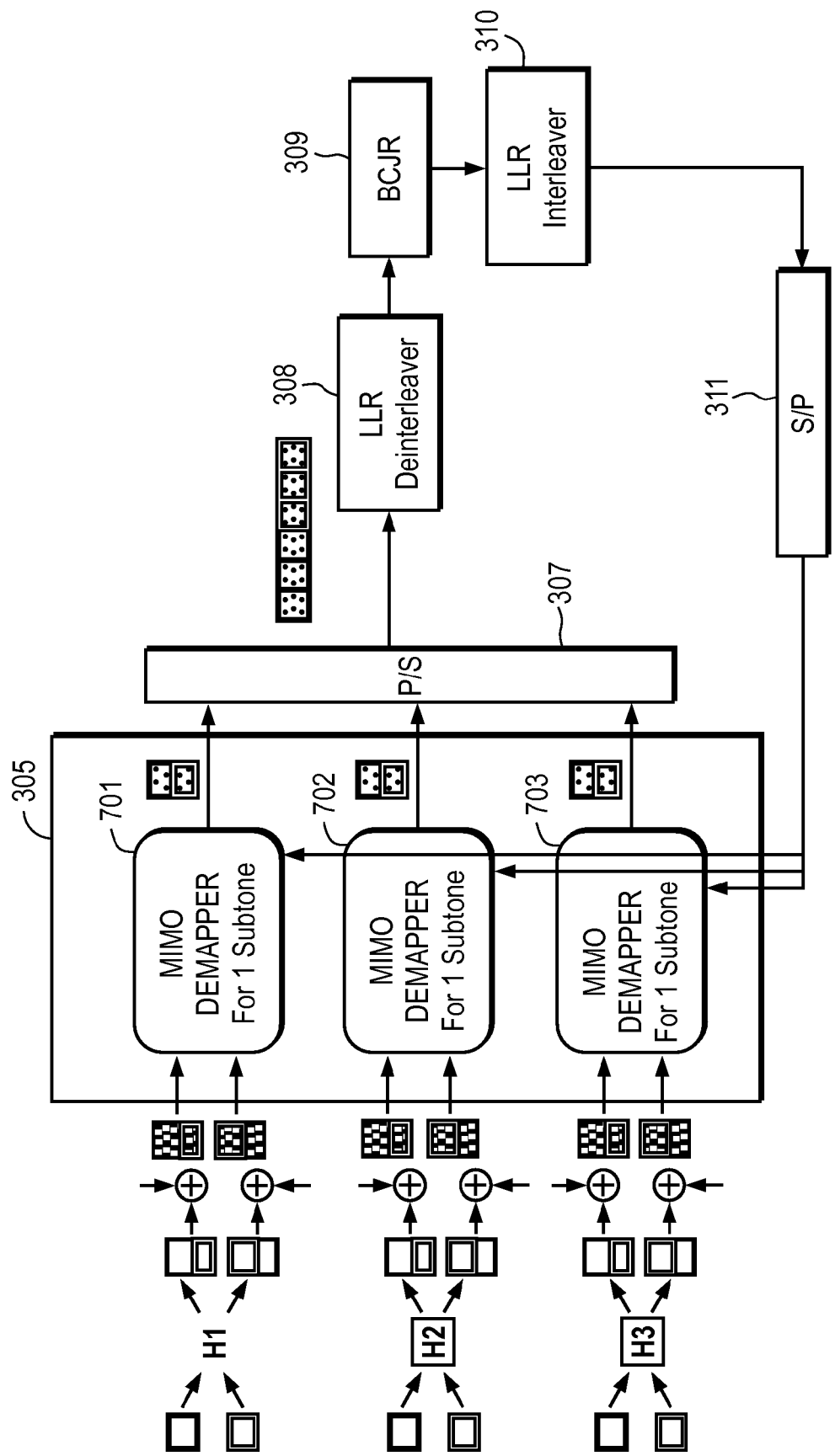
FIG. 7 illustrates another representation of the receiver of FIG. 3 in which each MIMO demapper for each tone is shown.

The MIMO demapper receives $y_1$ and $y_2$ signals and returns estimates of the bits represented by the symbols $s_1$ and $s_2$, for one tone, which translates into providing hard estimates for all bits representing the two symbols. The MIMO demapper also provides reliability (soft) information on each bit representing each of the symbols $s_1$ and $s_2$. In addition, soft-output (reliability information) is provided on the set of estimated bits. FIG. 7 illustrates another representation of the receiver of FIG. 3 in which each MIMO demapper for each tone is shown.

After the QR-decomposition, two scalar measurements are obtained in the form described in equation (4). For illustration purposes, consider the permutation order π corresponding to the order $s_1$, $s_2$. Due to the structure of the $L^\pi$ matrix in (4), the first measurement in y only depends on $s_1$ while the second depends on both $s_1$ and $s_2$. Next, the metric in equation (6) is considered, which in this case is a sum of two terms. The first term (m=1) is the term due to the first measurement in y and only depends on $s_1$. The second term (m=N=2) is term due to the second measurement (and consists of an $l_{12}$ and an $l_{22}$ term). This structure allows the computation of each of the metrics in (6) to be performed on a tree. At the first level of the tree only the first terms (m=1) in the sums in (6) are computed. Since these depend only on $s_1$ the number of terms computed (and thus number of level-1 nodes in the tree) equals the number of possible values $s_1$ can take. In the second step, from each node at level one (each corresponding to a distinct value of $s_1$), leafs for each possible value of $s_2$ are extended, and the second term (branch metric) in the sum in equation (6) is computed and added to $1^{st}$ term corresponding to the particular value of $s_1$. In the end (level 2 in this case), there are as many end nodes as there are candidate vectors of symbols, and each node represents a computation of (6) for a specific vector symbol candidate. Those can thus be compared as in (5) to provide bit estimates and reliability information for all the bits represented by the QAM symbol vector.

FIG. 8 illustrates the decision tree that allows this recursive computation of metrics on a tree in the case that there are three transmit antennas and thus $N_t=N_r=N=3$. The SOMA algorithm does not search the full tree, but rather a limited set of paths. The way the paths are limited is to start expanding paths from the root of the tree and at each level keeping only a subset of the paths as surviving paths (i.e., as paths that will be further extended). Referring to FIG. 8, at each new level of the tree, a decision is made to expand the tree for only the M best branches. This decision can be based by calculating the partial distance metric for each candidate. Specifically, at level "n", the distance metric used for comparisons corresponds to the first "n" terms of equation (6) (i.e., the sum of all terms in equation (6) for m=1, 2, . . . , "n"). Then based on this metric the best M metrics are selected as survivors. Thus, the tree is pruned at each depth by keeping only the best M paths. This is represented in FIG. 9.

More specifically with respect to the searching the tree, the SOMA operates its search on a tree that is associated with a specific symbol order. The full tree without pruning represents all possible combinations of sequences of QAM symbols where the length of the sequences (or the depth of the tree) is equal to the number of transmit antennas. Let Q denote the number of possible values of a single QAM symbol (Q=$2^B$). At depth one in the tree, there are Q candidates each corresponding to the Q values associated with "so-called" ordered $1^{st}$ symbol. At the next depth, Q candidates are expanded from each of the candidates of level 1, each candidate corresponding to the Q values associated with "so-called" ordered $2^{nd}$ QAM symbol, and so on, until level N, in which case all symbol values for all N transmitted QAM symbols (on the given OFDM tone) have been represented. For example, for a 6×6 MIMO antenna system with 64QAM, the length of the sequences is 6 QAM symbols. The SOMA prunes the tree in decoding and only searches the most promising part of the tree according to a metric at each level.

When applying SOMA on a specific OFDM tone, there are N measurements (as many as there are receive and transmit antennas) and N QAM symbols that need to be resolved (these are the symbols transmitted on this OFDM tone over the N transmit antennas). In order to apply the SOMA on a tree representing a specific symbol order, a preprocessing technique is applied on the N measurements, which is based on the well-known QR decomposition (performed by a QR decomposition front end of the joint demapper). The N-dimensional column vector representing all N measurements is projected to a unitary transformation. Specifically, the vector is left-multiplied by a matrix A that has dimensions N rows by N columns, and satisfies $AA^H$=I, where I is the identity matrix and the superscript "H" represents the transposition and element-wise conjugation operation. Any such unitary transformation of the measurements is invertible and therefore information preserving. As a result, the new processed N measurements, i.e., the result of the left multiplication of the original measurements, are information preserving. When the unitary matrix A is chosen based on the QR decomposition of the channel matrix, the resulting processed measurements have the following property: the first measurement only depends on the $1^{st}$ ordered symbol; the $2^{nd}$ measurement only depends on the $1^{st}$ and the $2^{nd}$ ordered symbols; the kth measurement depends only the first k ordered symbols. These processed measurements are then used to implement the SOMA algorithm on a tree with the specific symbol order. Note that to operate the SOMA on a tree formed by a different symbol order, a different unitary matrix A should be used. The new unitary transformation would then generate a different set of processed measurements, so that the kth measurement only depends on the k first symbols in the new symbol order.

In one embodiment, the decoding tree is organized based on reordering the symbols according to their received energy levels or signal to noise ratio (SNR) levels. In one embodiment, these received signal or SNR levels are estimated from the channel state information at the receiver, and potentially taking into account extrinsic information provided by the outer decoder. To compute the received symbol energy associated with the kth symbol (i.e., the QAM symbol transmitted by the kth transmit antenna), the receiver computes the total received channel-coefficient energy from the kth transmit antenna to all receive antennas. The symbol corresponding to the highest received energy level is placed at the root of the tree and is processed first in the decoding algorithm. The second symbol in the tree is ordered such that it has the second highest received energy level. The remaining symbols are selected according to decreasing received energy level values. This ranking yields better detection efficiency. Then, following the required QR decomposition, the SOMA in its simplest form can be operated with a fixed value of M, as well as fixed T and I parameters. In another embodiment, the signal energies of the symbols that are relevant during the tree search are instead used for ordering. First, all symbols are tested as the first symbols in the tree order and the symbol with the highest signal energy on the first-level tree is chosen. Then all remaining symbols are considered as the second symbol in the order, and the symbol with the highest signal level on the second level on the tree is chosen as the second symbol in the order. The process continues until all symbols have been ordered. In one embodiment, the signal energy on the tree of each of the symbols tested can be computed as follows. Assume that a symbol is being considered as the "m"th ordered symbol at level m on the tree (after symbols 1, 2, . . . , m−1 in the order have already been selected). An order π is chosen, whereby the first m symbols are the given ordered symbols and where an arbitrary order is placed on the remaining symbols. Then the QR decomposition for that symbol order is performed and an equation of the form of Equation (4) is obtained. Then the magnitude of the "m"-th entry on the main diagonal of the matrix $L^\pi$ in Equation (4) denotes the signal-level on the "m"-th symbol in the tree. Note that only the magnitude of the "m"-th entry on the main diagonal is needed, and the value of that entry can be computed in a computationally efficient manner, without performing the full QR decomposition. Specifically, consider selecting the "m"-th ordered symbol. In the described embodiment, the first m−1 symbols in the order have already been selected and all remaining symbols are compared as the "m"-th symbol in the order. For each of these symbols, a QR decomposition is obtained for a (symbol-specific) order g according to which the first m−1 symbols are the already chosen symbols, the "m"-th symbol is the symbol in comparison, and the rest of the order is arbitrary. Consider a fixed but arbitrary row among the first m−1 rows of the matrix A in the QR decomposition. Any such row of the matrix A is the same for each of these QR decompositions that test symbols as the m-th ordered symbols. Also, only the "m"-th row of the A matrix associated with any such order π needs to be determined, in order to obtain the required SNR information, i.e., in order to obtain the "m"-th element along the main diagonal of the matrix $L^\pi$ in Eqn. (4). This can be computed efficiently in a manner well known in the art.

Note that, as described above, the symbol ordering for setting up the SOMA search tree is conducted on a per-tone basis, i.e., the ordering is performed independently for every tone in the OFDM system. In principle, however, this is not required. In another embodiment, other block-reordering schemes are used in which the same tree-search order is chosen for a block of tones by comparisons of the received symbol levels over the given block of tones.

The tree-search symbol reordering technique has a number of advantages. One advantage is that it provides a method for a high performing inner joint demapper with soft output, with an overall complexity that makes it implementable in an iterative decoding setting. Furthermore, tree ordering requires minimal additional complexity, and can yield improved performance for the same complexity, or allow achieving the same bit-error-rate performance with lower receiver complexity.

Note that the SOMA detection process also calculates the soft (reliability) information on each bit, besides choosing the best path, in a manner well-known in the art.

Figure 10:
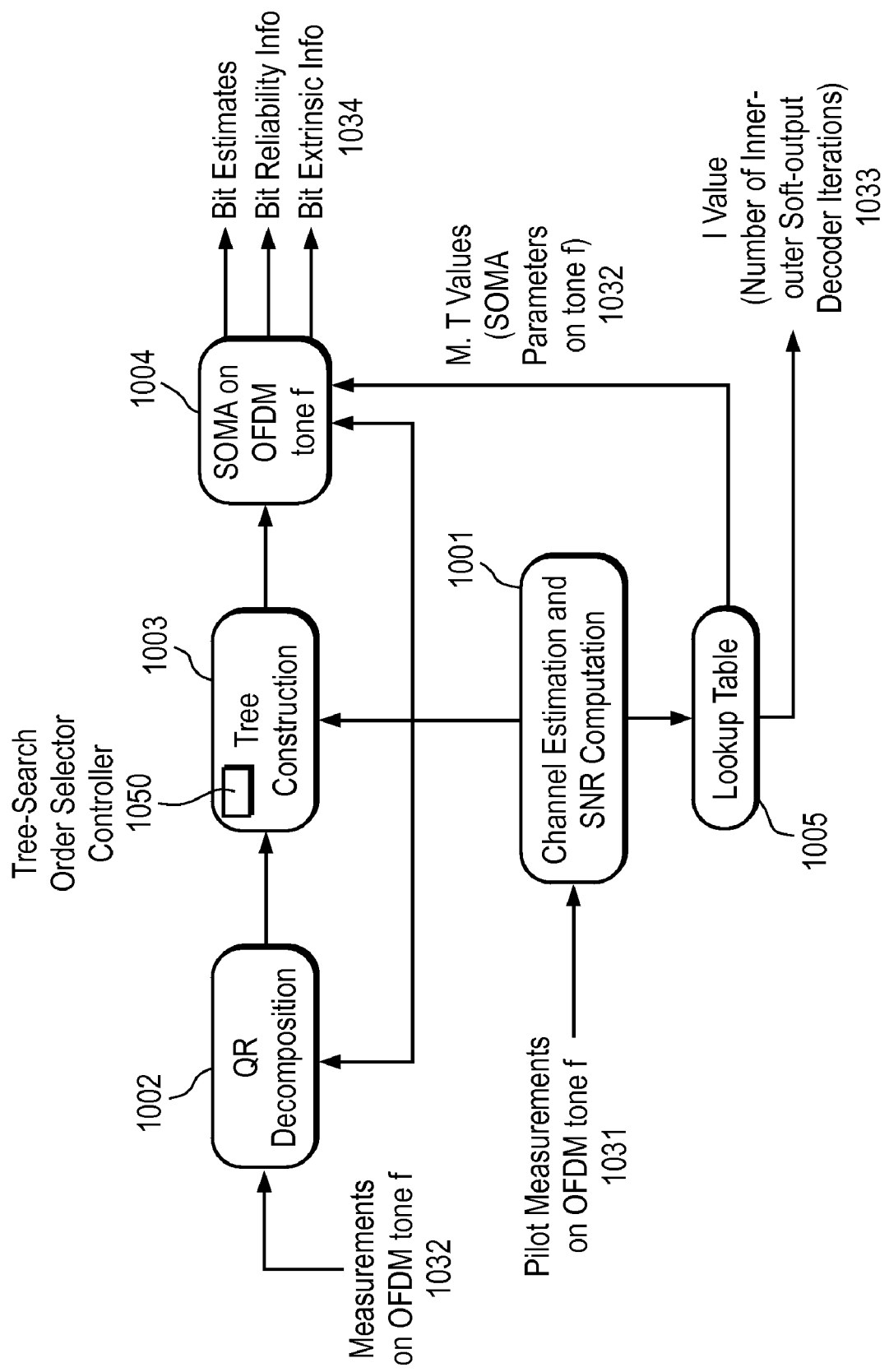
FIG. 10 is a flow diagram of one embodiment of a process for setting up the SOMA inner decoding operation on a tone.

In one embodiment, the complexity of the inner SOMA decoder is controlled by the values of the parameters M (the number of best paths) and T (the early-terminated paths). The overall complexity is also controlled by the number of times the inner decoding algorithm is used, which, in turn, is determined by the number of OFDM tones and the number of iterations (I) used for iterative decoding. FIG. 10 is a flow diagram of one embodiment of a process for setting up the SOMA inner decoding operation on tone f. The process is performed by processing logic that may comprise hardware (e.g., circuitry, dedicated logic, etc.), software (such as is run on a general purpose computer system or a dedicated machine), or a combination of both. The process is performed on each tone.

Referring to FIG. 10, first channel measurements are used (based on pilot signals) to estimate the channels between all transmit-receive antenna pairs on any given tone f (this would correspond to estimating the channel matrix H[f]) (1001). The channel estimation and SNR computation are based on pilot measurements on OFDM tone f (1031). The channel estimates and lookup table (LUT) 1005 are used to set up the adaptivity (e.g., changing the tree-search symbol order, changing M, T of the I, etc.) of SOMA.

More specifically, these measurements are used to set up the QR-decomposition of the channel matrix, set up the SOMA detection tree (1003) using tree-search symbol order selector/controller 1050, and select (e.g., by means of a lookup table) the parameters of the SOMA algorithm (1004). As the flow diagram reveals, the selection of these parameters depends on the channel conditions. Then, once the QR-decomposition (1002), detection tree (1003), and SOMA parameters have been set (1004), the measured data on all receive antennas on tone f (1032) are processed through a QR-decomposition (1002) to generate a set of effective channel measurements, the tree is constructed (1003) and then the SOMA inner detection algorithm is implemented. The SOMA is implemented on OFDM tone f using SOMA parameters on tone f provided by LUT 1005. The output of LUT 1005 may provide one or more variable values of the SOMA parameters on tone f, namely M, T (1032), and the number of inner-outer soft-output decoder iterations, namely I (1033). That is, LUT 1005 may specify the value of M (when M is adaptive) while the values of T and I are unchanged (non-adaptable), or the value of T (where T is adaptable) while the value of M and I are unchanged (non-adaptable). The same could occur for 2 or more of the values of M, T and I. These values may be changed at different depths/levels of the tree, such that adaptation occurs over different levels. In such a case, adaptation occurs based on tone quality and on depth. In an alternative embodiment, a LUT is not used and the values are changed in the SOMA algorithm itself. In such a case, in one embodiment, the values are thresholded in the algorithm. For example, if the channel estimate for the tone falls within a first range, a certain value of M is used (e.g., M=8), but if the channel estimate of the tone falls in another range, then a different value of M is used (e.g., M=12). These changes in value may also be based on the number of transmit antennas, the rate of the outer binary code, etc. Note that certain values may change based on whether the group of the paths with the best metrics have metrics that are clustered together, such that those in the cluster (more or less than M) or having values within a certain percentage of the worst metric in the cluster (e.g., with 95% of the value of the lowest quality metric in the cluster) are permitted to continue to the next level/depth in the tree. The resulting set of survivors may have cardinality more or less than M. Alternatively, the process may keep as survivor paths, all the paths whose relative metrics are within a certain percentage (e.g., 95%) of the metric of the best path. The outputs of the SOMA inner detection algorithm are bit estimates, bit relativity information and bit extrinsic information.

In one embodiment, tree-search symbol-order selector/controller 1050 and LUT 1005 are coupled. In such a case, tree-search symbol-order selector/controller 1050 selects an order and also specifies a decomposition of the form of Eqn. (4) that is used to set up the tree. The SNR values at level m on the tree are given by the m-th row of the L matrix in Eqn. (4). These SNR values can be also used to choose via the LUT 1005 values for e.g., the M parameter at each level of the tree.

Figure 11:
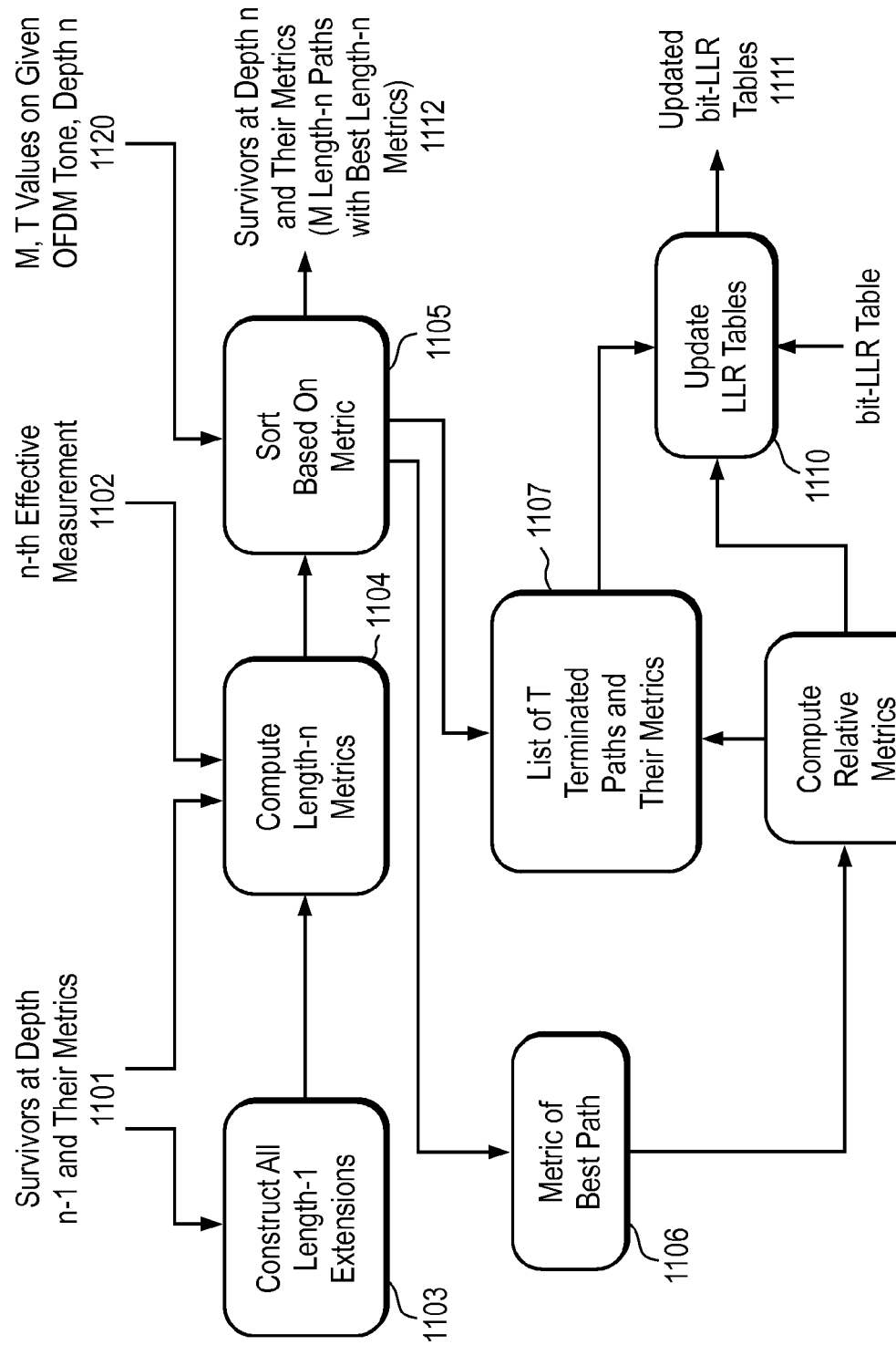
FIG. 11 is a flow diagram of the SOMA detection process at a particular depth.

A flow diagram of the SOMA detection process at depth n is shown in FIG. 11. Referring to FIG. 11, the main input is the set of survivors at depth n−1 and the metrics of these survivor paths (1101). First, all the possible length-1 extensions of each of these length-"n−1" paths are constructed based on the survivors of the pervious depth and their metrics (1101) to generate the set of all length-n paths that will be visited by the algorithm. Then the survivor metrics at depth n−1 (1101) and the effective measurement at depth n (1102) are used to compute the lengthen metrics (1104) of these length n paths that are constructed at 1103. Based on parameter values of M and T on a given OFDM tone, depth n (1120), the paths are then sorted based on their metric quality (1105). The M paths with the best metrics are chosen as survivors at depth n (1112), in the same manner as the well-known SOMA process. The rest of the paths are put in the list of the paths that are terminated (1107). For each one of these paths, a relative metric is computed (1109) with respect to the best path at length n (which, obviously is a survivor path). Then for each of the terminated paths, its relative metric is compared against a subset of entries in the bit-LLR (Least Likelihood ratio) table to decide whether or not that entry is to be updated. In particular, if the kth bit in the representation of the mth symbol is 0, the (k,m) entry of $\Delta^{(0)}$ is updated (1108); else, the (k,m) entry of $\Delta^{(1)}$ is only updated (1108). The entry gets updated if the relative metric provided by the new path improves the metric in the associated entry in the LLR table. The output is updated bit-LLR tables (1111).

Other Adaptive Embodiments

In one embodiment, the adaptive SOMA receivers can be additionally adapted in other ways as well (e.g., SOMA algorithms that have variable M in the tree and adapt the M, I, T parameters to the quality of the OFDM tones). One embodiment of the invention can be used independently or optionally be combined with those adaptation methods.

In another embodiment, the SOMA-based MIMO detection process is adapted based on the number of early-terminated paths in the tree (T), which are used in soft-output value calculations. In another embodiment, the SOMA-based MIMO detection process is adapted based on the number of iterations for each tone based on tone quality. In yet another embodiment, the SOMA-based MIMO detection process is adapted during each iteration and for every tone based on tone quality. In another embodiment, the SOMA-based MIMO detection process adapts one or more of the parameters, a number of early-terminated paths in the tree, and a total number of iterations based on tone quality.

In one embodiment, the different SOMA detectors are used for the different tones and are selected adaptively based on the quality of the tones. For a tone with good quality (high signal level, or high SNR), the M-value can be lowered and/or the T-value can be lowered and/or the I value can be lowered. The range of values for M and T vary as a function of number of transmit streams (number of transmit antennas) N, the size of the QAM constellation employed and the rate of the outer code in the system. As an example, based on experiments in 4 by 4 16 QAM MIMO, M=16 suffices to get near optimal performance. However, this value increases with increasing number of streams and QAM constellations. Typically, a (pre-computed) lookup table can be employed that lists the value of M (and T) that should be used for set of SNR (or signal level) ranges. This approach yields lower relative complexity for that particular SOMA detector. On the other hand, for a tone (OFDM subchannel) of poor quality (low signal level or low SNR), higher values will be chosen for all or a subset of M and T and I. One approach for instance corresponds to setting a target performance in bit-error-rate at the mobile (this can be preset by the application). In this case, the higher the SNR on the tone, the lower the value of M needed to achieve the desired performance. As the SNR is reduced, the opposite effect takes place. However, there is an SNR level such that lowering the receive SNR beyond that value makes it impossible to achieve the desired performance at the mobile (no matter what the complexity). Beyond that level, either the maximum allowable value of M is used or the event is declared in outage. This leads to a higher value of complexity for this particular tone. The adaptive use of the SOMA and the number of iterations saves complexity without reduced performance. For the non-adaptive case the performance will, to a large extent, be dictated by the worst-quality tone, which corresponds to the highest relative complexity for the SOMA detectors.

In another embodiment, a metric correction term is applied for the soft output algorithm, much the same as the one used in the corrected SOVA algorithm. See, for example, Kitty Wong, "The Soft Output M-algorithm and its applications," PhD Thesis, Queens University, Kingston, Canada, August 2006.

In yet another embodiment, the mapper type is a set partition type mapper rather than a Gray mapper for the QAM constellations for iterative decoding.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A device for use in a wireless communication system having a transmitter, the device comprising:
a receiver to receive information-bearing signals from the transmitter wirelessly transmitted using OFDM and bit interleaved coded modulation, the receiver comprising an inner decoder structure having a soft output M-algorithm (SOMA) based multiple-in multiple-out (MIMO) joint demapper that uses a SOMA-based MIMO detection process to perform joint inner demapping over each tone, the SOMA-based MIMO joint demapper being operable to search a detection tree for each tone using a tree-search symbol order that is adapted for each tone based on channel state information and extrinsic information from the outer decoder, where only a number of best alternatives from every level of the tree are expanded, wherein the SOMA-based detection process calculates soft output values by comparing a locally estimated best path at each depth in the detection tree with corresponding alternative paths that are not further extended at each depth.

2. The device defined in claim 1 where the SOMA-based MIMO joint demapper is operable to provide soft-output information for bits being decoded.

3. The device defined in claim 1 wherein the SOMA-based MIMO joint demapper is operable to identify a best candidate among a number of candidates by searching the detection trees.

4. The device defined in claim 1 wherein the channel state information comprises estimated received symbol energy with the symbol with the highest symbol energy being at the root of the tree, the symbol with the next highest energy being next in the tree, and with the remaining symbols being in the tree according to decreasing energy levels.

5. The device defined in claim 1 wherein the channel state information and extrinsic information are combined to create a signal-to-noise ratio (SNR) criterion.

6. The device in claim 5 wherein the tree-search order is based on one of signal-levels and SNRs of symbols on the tree.

7. The device defined in claim 1 wherein the inner decoder structure comprises a controller to select the tree-search order given a channel matrix.

8. The device defined in claim 1 wherein the controller selects the tree search symbol order by iteratively selecting among the symbols.

9. The device defined in claim 1 wherein the tree-search symbol order is selected for a group of two or more tones.

10. The device defined in claim 1 further comprising a soft-in soft-out (SISO) decoder to use the soft output values from the inner SOMA-based MIMO joint demapper to produce output data, wherein the SISO decoder feeds soft values back to the inner decoder structure for iterative decoding.

11. The device defined in claim 1 wherein the SOMA-based MIMO detection process is adaptable based on a number of early-terminated paths in the tree (T), which is used in soft output value calculations.

12. The device defined in claim 1 wherein the SOMA-based MIMO detection process is adaptable based on number of iterations for each tone based on tone quality.

13. A device for use in a wireless communication system having a transmitter, the device comprising:
   a receiver to receive information-bearing signals from the transmitter wirelessly transmitted using OFDM and bit interleaved coded modulation, the receiver comprising an inner decoder structure having a soft output M-algorithm (SOMA) based multiple-in multiple-out (MIMO) joint demapper that uses a SOMA-based MIMO detection process to perform joint inner demapping over each tone, the SOMA-based MIMO joint demapper being operable to search a detection tree for each tone using a tree-search symbol order that is adapted for each tone based on channel state information and extrinsic information from the outer decoder, where only a number of best alternatives from every level of the tree are expanded, and further wherein the SOMA-based MIMO joint demapper includes a plurality of SOMA detectors, one for each tone, and wherein the parameter changes per tone inside one SOMA detector, such that the search of the tree occurs with a variable number of expanded paths as well as a variable number of use early terminated paths at each level in the soft output calculations.

14. The device defined in claim 1 wherein the receiver further comprises an outer decoder communicably coupled to receive the output from the inner decoder structure and generate a soft output.

15. The device defined in claim 13 wherein the outer decoder comprises a BCJR decoder.

16. The device defined in claim 13 wherein the outer decoder is operable to generate feedback information to the inner decoder structure for use in iterative decoding.

17. The device defined in claim 13 wherein the outer decoder comprises a soft-input hard-output decoder for use without iterative decoding.

18. The device defined in claim 16 wherein the soft-input hard output decoder comprises a Viterbi decoder.

19. The device defined in claim 1 wherein the receiver further comprises:
   a plurality of antennas;
   a plurality of fast Fourier transform (FFT) modules, each of the plurality of FFT modules coupled to receive signals from one of the plurality of antennas; and
   an outer decoder associated with an outer binary encoder to decode a first set of data output by the demapper to produce output data from the receiver.

20. The device defined in claim 18 wherein the outer decoder comprises a MAP decoder for the outer encoder, and the outer binary encoder comprises an outer convolutional encoder.

21. The device defined in claim 16 wherein the outer decoder is one of a group consisting of a MAP decoder, a MaxLogMAP decoder, and a turbo-type decoder, each for an encoder that comprises one of a group consisting of a binary rate-compatible punctured convolutional (RCPC) code, a binary turbo code and a binary LDPC code.

22. A method comprising:
   evaluating quality of individual OFDM tones received by a receiver in a wireless communication system; and
   performing a first decoding operation to produce a first set of output data representing most likely transmitted bit estimation values and information about the reliability of each of these estimates, including
      performing a SOMA-based MIMO detection process over each tone for joint inner demapping, by searching a detection tree for each tone using a tree-search symbol order that is adapted for each tone based on at least channel state information, where only a number of best alternatives from every level of the tree are expanded, and further
      wherein performing a first decoding operation further comprises calculating soft output values by comparing an estimated best path with best alternative paths branching off the best path, wherein each are terminated at the end of the tree or non-terminated at every level.

23. The method defined in claim 22 wherein performing a first decoding operation further comprises using the soft output values from the inner SOMA-based MIMO detection process to produce output data, by use of a soft-output outer decoder and feeding soft values back to an inner decoder structure performing the first decoding operation for iterative decoding.

* * * * *